US012689524B1

(12) United States Patent
Bhat et al.

(10) Patent No.: US 12,689,524 B1
(45) Date of Patent: *Jul. 21, 2026

(54) SELECTING ARTIFICIAL INTELLIGENCE AGENTS FOR FUNCTION EXECUTION

(71) Applicant: Citibank, N.A., New York, NY (US)

(72) Inventors: Ganesh Prasad Bhat, West Orange, NJ (US); Imir Arifi, Nashville, TN (US); James Myers, New York, NY (US); Sofia Rahman, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/538,785

(22) Filed: Feb. 12, 2026

Related U.S. Application Data

(63) Continuation of application No. 19/335,671, filed on Sep. 22, 2025.

(51) Int. Cl.
| | |
|---|---|
| *H04L 9/00* | (2022.01) |
| *G06F 21/62* | (2013.01) |
| *H04L 9/32* | (2006.01) |
| *H04L 9/40* | (2022.01) |

(52) U.S. Cl.
CPC .............. *H04L 9/3247* (2013.01); *H04L 9/50* (2022.05); *G06F 21/62* (2013.01); *H04L 9/3297* (2013.01); *H04L 63/308* (2013.01)

(58) Field of Classification Search
CPC ....... H04L 9/3247; H04L 9/50; H04L 9/3297; H04L 63/308; G06F 21/62
USPC ....................................................... 713/176
See application file for complete search history.

(56) References Cited

U.S. PATENT DOCUMENTS

| | | | | |
|---|---|---|---|---|
| 12,373,497 | B1* | 7/2025 | Fletcher .............. | G06F 9/45533 |
| 2010/0114786 | A1* | 5/2010 | Aboujaoude ........ | G06Q 10/103 |
| | | | | 705/301 |
| 2016/0300178 | A1* | 10/2016 | Perry ............. | G06Q 10/063116 |
| 2017/0270455 | A1* | 9/2017 | Chi ................. | G06Q 10/063112 |
| 2019/0334700 | A1* | 10/2019 | Callan ...................... | H04L 9/083 |
| 2020/0026785 | A1* | 1/2020 | Patangia ............... | H04L 9/0643 |
| 2020/0334531 | A1* | 10/2020 | Swett ................... | G06N 3/0499 |
| 2021/0008448 | A1* | 1/2021 | Kolen ...................... | G06N 5/04 |

(Continued)

*Primary Examiner* — Thanh T Le

(74) *Attorney, Agent, or Firm* — Perkins Coie LLP; Sumedha Ahuja; Willa Wu

(57) ABSTRACT

Methods and systems for routing execution requests to autonomous artificial intelligence agents using performance-based selection are disclosed herein. An agent routing system may receive a prompt for completing an action using artificial intelligence agents from a plurality of agents, where each agent may be associated with computer-executable operations configured for autonomous execution on software applications. The system may determine a set of agents enabled to complete the requested action and may access action completion datasets for these agents. Each dataset may include action parameters for completed actions, including status parameters indicating successful completion and timestamps of completion. The system may select an artificial intelligence agent based on a frequency composite parameter generated from successful completion status parameters and a time composite parameter indicating completion timing. The system may identify parameters required by the selected agent to complete the action and may transmit these parameters to the artificial intelligence agent for execution.

21 Claims, 9 Drawing Sheets

(56) References Cited

U.S. PATENT DOCUMENTS

| | | | |
|---|---|---|---|
| 2021/0021431 A1* | 1/2021 | Guim Bernat | H04L 9/3239 |
| 2021/0045187 A1* | 2/2021 | Sun | H04L 41/20 |
| 2021/0114472 A1* | 4/2021 | Stephens | B60L 53/64 |
| 2022/0174059 A1* | 6/2022 | Fields | H04L 9/3239 |
| 2022/0398547 A1* | 12/2022 | Wang | G06N 20/00 |
| 2023/0028681 A1* | 1/2023 | Flynn | H04L 63/102 |
| 2023/0305896 A1* | 9/2023 | Wood | H04L 9/0894 |
| 2024/0028417 A1* | 1/2024 | Manamohan | G06N 20/00 |
| 2024/0144142 A1* | 5/2024 | Khan | G06Q 10/0639 |
| 2024/0249284 A1* | 7/2024 | Poornachandran | G06F 9/5027 |
| 2025/0244964 A1* | 7/2025 | Mystetskyi | G06F 8/65 |
| 2025/0251989 A1* | 8/2025 | Yang | G06F 9/5055 |
| 2025/0330677 A1* | 10/2025 | Chomal | G06N 5/01 |
| 2025/0348363 A1* | 11/2025 | Jung | G06F 9/5044 |
| 2025/0355641 A1* | 11/2025 | Madden | G06F 8/10 |

* cited by examiner

400

SELECTING ARTIFICIAL INTELLIGENCE AGENTS FOR FUNCTION EXECUTION

CROSS-REFERENCE TO RELATED APPLICATIONS

This application is a continuation of U.S. application Ser. No. 19/335,671, titled "SELECTING ARTIFICIAL INTELLIGENCE AGENTS FOR FUNCTION EXECUTION", and filed Sep. 22, 2025, the entirety of which is incorporated herein by reference.

BACKGROUND

The proliferation of autonomous artificial intelligence agents across distributed computing environments has created unprecedented challenges in managing inter-agent communications and routing. As AI systems become more sophisticated and numerous, the complexity of coordinating communications between agents has grown exponentially, often overwhelming traditional routing approaches. Current routing solutions for AI agent communications typically rely on centralized architectures or static protocol-based systems. Centralized routing systems, while straightforward to implement, create bottlenecks and single points of failure as the number of agents scales. Static protocol-based routing approaches, originally designed for relatively stable network topologies, struggle to adapt to the dynamic nature of AI agent ecosystems where agents may frequently appear, disappear, or change capabilities.

The biological world demonstrates remarkable examples of efficient distributed coordination through swarm intelligence principles. Ant colonies optimize pathfinding through pheromone-based communication, while bee colonies use sophisticated signaling mechanisms to share resource information. These natural systems exhibit emergent intelligence, adaptive optimization, fault tolerance, and scalability properties that could potentially address the limitations of current AI agent routing approaches.

SUMMARY

Accordingly, an autonomous routing system is disclosed herein for efficiently routing action requests submitted to a generative learning model (e.g., a large language model). The routing system may receive a prompt for completing an action using one or more artificial intelligence agents (AI agents). The one or more AI agents may be selected from a plurality of artificial intelligence agents such that each agent is associated with a corresponding computer-executable operation set configured to be autonomously executed on a software application set. Thus, the routing system may then determine a set of artificial intelligence agents from all the available AI agents that are enabled to complete the action. Furthermore, the routing system may access a set of action completion datasets for the set of artificial intelligence agents. Each dataset may include a corresponding plurality of action parameters for a plurality of actions completed by each agent. Furthermore, each plurality of parameters may include a corresponding status parameter indicating whether a corresponding action was completed successfully and a corresponding timestamp of when the corresponding action was completed. The routing system may then select an artificial intelligence agent from the set of artificial intelligence agents to complete the action based on a corresponding frequency composite parameter generated based on each status parameter indicating successfully completing the corresponding action and a time composite parameter indicating a time of successfully completing the corresponding action. The routing system may then identify a set of parameters required by the artificial intelligence agent to complete the action and may transmit the set of parameters to the artificial intelligence agent.

In some aspects, the autonomous routing system may be configured to receive action completion requests from users or other systems and process those requests using one or more artificial intelligence (AI) agents. Specifically, the autonomous routing system may receive a prompt for completing an action using one or more artificial intelligence agents of a plurality of artificial intelligence agents. The prompt may be a natural language request, an application programming interface (API) call, or a structured command that specifies the desired action to be performed (e.g., by an AI agent).

The autonomous routing system may identify which AI agents are capable of performing the requested task. In particular, the autonomous routing system may determine a set of artificial intelligence agents from the plurality of artificial intelligence agents that are enabled to complete the action. Each artificial intelligence agent of the plurality of artificial intelligence agents may be associated with a corresponding computer-executable operation set configured to be autonomously executed by a corresponding artificial intelligence agent on a software application set. For example, the autonomous routing system may maintain a registry of AI agents and their capabilities, filtering agents based on their registered skill sets and operational parameters. Thus, the autonomous routing system may select at least one of those AI agents.

The autonomous routing system may retrieve historical performance data for candidate AI agents. In particular, the autonomous routing system may access a set of action completion datasets for the set of artificial intelligence agents. Each action completion dataset may include a corresponding plurality of action parameters for a plurality of actions completed by each artificial intelligence agent. Furthermore, each plurality of parameters may include a corresponding status parameter indicating whether a corresponding action was completed successfully and a corresponding timestamp of when the corresponding action was completed. For example, the autonomous routing system may query a blockchain-based storage system to retrieve performance metrics, success rates, and timing data for each eligible AI agent.

The autonomous routing system may choose the most suitable AI agent based on performance metrics. In particular, the autonomous routing system may select, based on a corresponding frequency composite parameter generated based on each status parameter indicating successfully completing the corresponding action and a time composite parameter indicating a time of successfully completing the corresponding action, an artificial intelligence agent of the set of artificial intelligence agents to complete the action. For example, the autonomous routing system may calculate weighted scores combining success rates and recency of success based on the timestamps, then select the agent with the highest composite score.

The autonomous routing system may determine what information the selected AI agent needs to perform the task. In particular, the autonomous routing system may identify a set of parameters required by the artificial intelligence agent to complete the action. For example, the autonomous routing system may analyze the agent's input requirements and extract relevant data from the original prompt or external data sources.

The autonomous routing system may then send the necessary information to the chosen AI agent. In particular, the routing system may transmit the set of parameters to the artificial intelligence agent. For example, the autonomous routing system may format the parameters according to the agent's API specifications and send them via secure communication protocols.

According to other aspects of the present disclosure, the routing system may include one or more of the following features. The autonomous routing system may receive a message from the artificial intelligence agent including a completion status associated with the action. The message may include one or more status parameters associated with the completion status. In some implementations, the autonomous routing system may generate a blockchain operation including the one or more status parameters received from the artificial intelligence agent. The blockchain operation may be cryptographically signed by a private key associated with the agent routing system and may be transmitted to a blockchain node. The blockchain node may commit the blockchain operation to a blockchain.

In some implementations, the autonomous routing system may perform the following operations for accessing the set of action completion datasets for the set of artificial intelligence agents. The autonomous routing system may determine for each artificial intelligence agent, based on a corresponding public key associated with each artificial intelligence agent, a corresponding blockchain identifier that identifies each artificial intelligence agent on a blockchain, and may transmit a search request to a blockchain node. The search operation may include each corresponding blockchain identifier for each artificial intelligence agent to identify the relevant data on the blockchain.

In some implementations, the autonomous routing system may select the artificial intelligence agent using the following operations. The autonomous routing system may retrieve a plurality of status parameters for each artificial intelligence agent and corresponding timestamps, and may aggregate, for each artificial intelligence agent in the set of artificial intelligence agents, a corresponding plurality of status parameter indicating successfully completing the corresponding action into the corresponding frequency composite parameter, and a corresponding plurality of timestamps into the time composite parameter. The autonomous routing system may then select the artificial intelligence agent based on a combination of a highest frequency composite parameter and a shortest time composite parameter.

In some implementations, the autonomous routing system may search for new available AI agents and add the new agents and their capabilities to the available agent list. In particular, the autonomous routing system may detect the availability of a new plurality of artificial intelligence agents and may determine, for each new artificial intelligence agent of the new plurality of artificial intelligence agents, a corresponding set of actions enabled to be performed by each new artificial intelligence agent. The autonomous routing system may then generate a corresponding new blockchain identity for each new artificial intelligence agent, and store each corresponding new blockchain identity with the corresponding set of actions enabled to be performed by each new artificial intelligence agent.

In some implementations, the autonomous routing system may transmit to other neighboring routing systems identity of new available agents. In particular, the autonomous routing system may generate a routing message including each corresponding new blockchain identity with the corresponding set of actions. The autonomous routing system may sign the message by generating, using a private key associated with the agent routing system a cryptographic signature for the routing message. The autonomous routing system may then transmit, to a plurality of routing systems, a message including each corresponding new blockchain identity with the corresponding set of actions and the cryptographic signature.

In some implementations, the autonomous routing system may verify any messages received from any AI agents. In particular, the autonomous routing system may receive a message from the artificial intelligence agent including a completion status associated with the action. The message may include one or more status parameters associated with the completion status and a cryptographic signature associated with the artificial intelligence agent. The cryptographic signature may be generated using a private key associated with the artificial intelligence agent, the private key being associated with a public key derivable from a blockchain identifier associated with the artificial intelligence agent. The autonomous routing system may then retrieve, using a blockchain node from a blockchain, the public key associated with the artificial intelligence agent and may verify the message using the private key and the cryptographic signature.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

Figure 1:
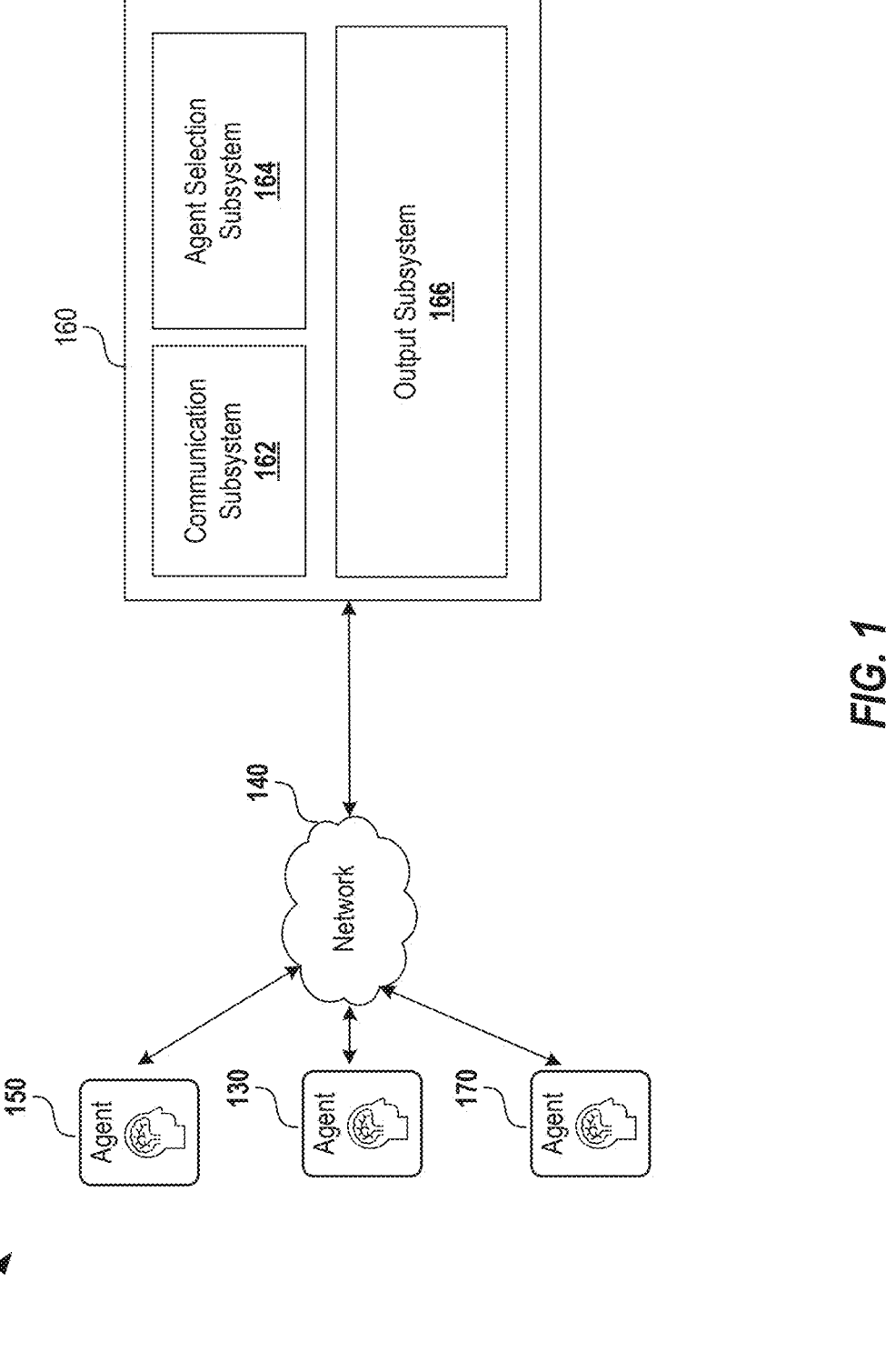
FIG. 1 shows an illustrative system for efficiently routing action requests submitted to a generative learning model, in accordance with one or more embodiments of this disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein. Furthermore, in the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement.

The autonomous routing system disclosed herein may implement bio-inspired swarm intelligence principles to facilitate communication between autonomous artificial intelligence agents in distributed computing environments. Traditional centralized routing systems may create single points of failure and bottlenecks when managing communications among large numbers of AI agents, while static protocol-based routing approaches may struggle to adapt to the dynamic nature of agent ecosystems where agents frequently appear, disappear, or change capabilities. The autonomous routing system may address these limitations by implementing decentralized coordination mechanisms derived from biological swarm behaviors observed in ant colonies and bee colonies.

The system may eliminate the need for central orchestrators or servers by enabling individual agents to make routing decisions based on locally available information and collective intelligence patterns. In some cases, the autonomous routing system may implement digital equivalents of biological communication mechanisms, such as pheromone trails that record successful communication routes and waggle dance protocols that enable agents to share routing discoveries with peers. The system may continuously adapt to changing network conditions through environmental monitoring and parameter adjustment mechanisms that respond to factors including network load, agent density, failure rates, and communication patterns.

The autonomous routing system may achieve scalability through distributed decision-making processes that allow millions of agents to participate without performance degradation. The system may implement blockchain-based storage mechanisms to maintain persistent records of routing patterns, agent behaviors, and system performance data while ensuring tamper-resistant storage and temporal dynamics. In some cases, the system may support both permissioned and permissionless blockchain configurations, enabling deployment across various infrastructure environments including existing blockchain networks and dedicated routing-optimized blockchain implementations.

The system may provide fault tolerance through redundant routing paths and graceful degradation mechanisms that maintain functionality despite individual agent failures or network partitions. The autonomous routing system may implement multi-criteria optimization algorithms that simultaneously consider factors including latency, bandwidth availability, reliability metrics, economic costs, and security trust scores when selecting communication routes. The system may naturally distribute traffic loads across available routes through emergent load balancing behaviors that arise from the collective decision-making processes of participating agents.

In some implementations, the AI agents may be physical devices. For example, the AI agent may be a combination of software and hardware that may be packaged as an "agent device". The agent device may communicate wirelessly using a wireless transceiver. Furthermore, the agent device may have other sensors such as cameras, microphones, and/or other suitable sensors. In some implementations, agent devices may be attached to robots or even living things. For example, a small scale robot that may move in and out of various locations may host an AI agent. In some implementations, the agent device may be attached to a living thing such as insects, animals, and/or other living things.

Referring to FIG. 1, an environment 100 may provide a network architecture for facilitating communication and routing between autonomous artificial intelligence agents. Environment 100 may establish a distributed computing framework where multiple artificial intelligence agents may operate independently while maintaining coordinated communication capabilities through shared network infrastructure. Environment 100 may support scalable agent interactions by implementing decentralized routing mechanisms that eliminate dependencies on centralized coordination servers or orchestrators.

Environment 100 may include multiple artificial intelligence agents, including a first AI agent 130, a second AI agent 150, and a third AI agent 170, each configured to perform autonomous operations within the distributed system. Each agent 130, 150, 170 may represent an independent artificial intelligence entity capable of executing computer-executable operation sets and communicating with other agents through network protocols. The AI agents may maintain individual capabilities and operational parameters while participating in collective routing decisions based on locally available information and shared intelligence patterns. In some cases, the AI agents may dynamically appear, disappear, or modify their operational capabilities based on system demands and environmental conditions.

A communication network 140 may interconnect AI agents 130, 150, 170 and facilitate data exchange throughout the environment 100. Communication network 140 may provide bidirectional communication pathways that enable agents to transmit routing information, performance metrics, and operational status updates to other system components. Communication network 140 may support various network protocols and communication standards to accommodate heterogeneous agent implementations and diverse operational requirements. Communication network 140 may implement fault-tolerant communication mechanisms that maintain connectivity despite individual agent failures or network partitions.

An autonomous routing system 160 may manage routing decisions and coordinate communication pathways between AI agents 130, 150, 170 through the communication network 140. Autonomous routing system 160 may implement bio-inspired swarm intelligence principles derived from biological systems such as ant colonies and bee colonies to enable decentralized routing coordination. Autonomous routing system 160 may eliminate the need for centralized routing servers by enabling individual agents to make routing decisions based on collective intelligence patterns and locally available performance data. Autonomous routing system 160 may implement a digital pheromone trail system that records successful communication routes using blockchain technology with pheromone deposition, evaporation mechanisms, and strength calculations. In some implementations, autonomous routing system 160 may continuously monitor environmental conditions and dynamically adjust routing parameters based on factors including network load, agent density, failure rates, and communication patterns.

Autonomous routing system 160 may include multiple subsystems that collectively provide routing functionality and coordination capabilities. A communication subsystem 162 may handle message processing and protocol management for interactions between autonomous routing system 160 and AI agents 130, 150, 170 through the communication network 140. Communication subsystem 162 may implement message validation, cryptographic verification, and data formatting operations to ensure secure and reliable communication exchanges. An agent selection subsystem 164 may evaluate available agents and determine optimal routing paths based on performance metrics, capability assessments, and historical success data. Agent selection subsystem 164 may implement multi-criteria optimization algorithms that consider factors including latency measurements, bandwidth availability, reliability metrics, and security trust scores when selecting communication routes.

An output subsystem 166 may generate routing decisions and transmit coordination messages to participating agents through communication network 140. Output subsystem 166 may format routing instructions, performance feedback, and system status updates for distribution to AI agents 130, 150, 170 based on routing decisions made by agent selection subsystem 164. Output subsystem 166 may implement message prioritization and delivery confirmation mechanisms to ensure routing information reaches intended recipients within specified time constraints. Autonomous routing system 160 may include a colony memory system implemented as a distributed blockchain that maintains collective knowledge about routing patterns, agent behaviors, and system performance data while providing tamper-resistant storage and temporal dynamics for pheromone-based routing mechanisms. In some implementations, the colony memory system may be implemented using blockchain technology.

Figure 2:
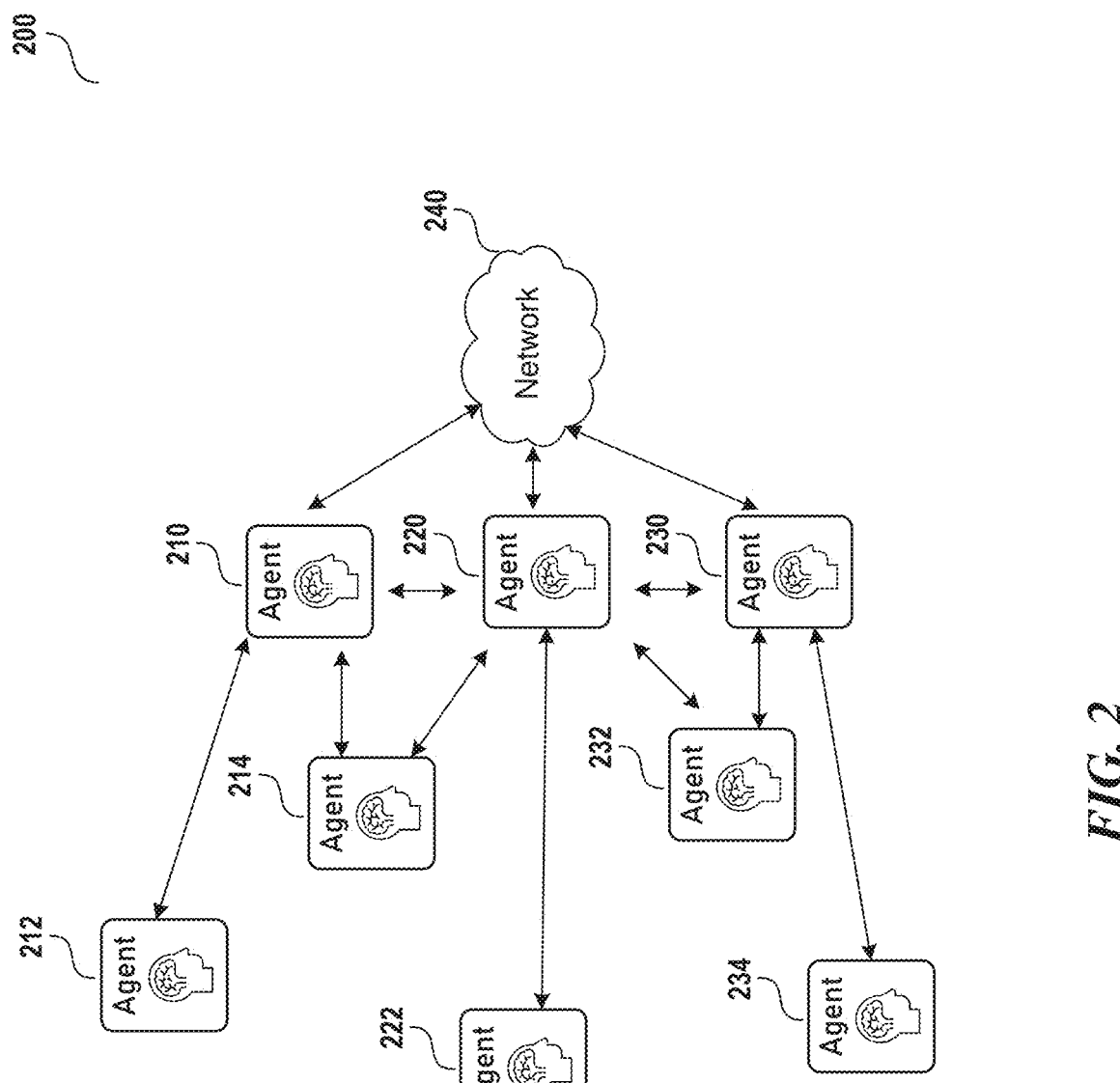
FIG. 2 illustrates agent routes, in accordance with one or more embodiments of this disclosure.

Referring to FIG. 2, an agent network 200 may provide a distributed topology configuration that enables multiple artificial intelligence agents to interconnect through various communication pathways within the environment 100. Agent network 200 may implement a mesh-like structure that facilitates redundant routing options and distributed communication capabilities throughout the network infrastructure. Agent network 200 may support scalable agent interactions by eliminating dependencies on centralized coordination mechanisms and enabling individual agents to establish direct communication links with multiple neighboring agents. The distributed configuration may enable autonomous routing system 160 to achieve scalability through local decision-making processes where individual agents make routing determinations based on locally available information without requiring global network state knowledge.

Agent network 200 may include multiple interconnected agent nodes that collectively form the distributed communication infrastructure. A first agent node 210 may establish bidirectional communication links with adjacent agent nodes to enable data exchange and routing coordination within the network topology. Agent node 210 may maintain connection pathways with a second agent node 212 and a third agent node 214, creating multiple routing options for data transmission between different network segments. A fourth agent node 220 may provide connectivity to multiple surrounding nodes including agent node 214, fifth agent node 222, sixth agent node 230, and external network infrastructure. Agent node 220 may serve as a routing hub that facilitates communication between different network segments while maintaining the decentralized nature of the overall system architecture.

The mesh-like structure of agent network 200 may enable multiple routing pathways between any two agent nodes, providing fault tolerance and load distribution capabilities. A seventh agent node 232 may establish connections with agent node 222 and agent node 230, creating redundant communication paths that maintain network connectivity despite individual node failures or communication link disruptions. An eighth agent node 234 may connect with agent node 232 and agent node 230, further extending the mesh topology and providing additional routing alternatives throughout the network. The interconnected configuration may enable autonomous routing system 160 to implement scout agents that continuously explore new routing paths using probabilistic selection algorithms to balance exploitation of known routes with exploration of alternatives. Scout agents may traverse the mesh topology to discover optimal communication pathways and evaluate route performance characteristics including latency, bandwidth availability, and reliability metrics.

Agent network 200 may interface with external network infrastructure through a network 240. Network 240 may provide connectivity between agent network 200 and other systems, enabling communication with blockchain nodes, external databases, and other distributed computing resources. The connection through network 240 may enable agent network 200 to access blockchain-based storage mechanisms for maintaining persistent records of routing patterns and performance data. Various agent nodes may serve as gateways that facilitate data exchange between the internal mesh topology and external network resources while maintaining the distributed coordination principles of the autonomous routing system 160.

The distributed communication paths within agent network 200 may support bounded memory mechanisms through pheromone evaporation processes that limit data growth and maintain system performance. Agent nodes may implement lazy propagation techniques where routing information spreads throughout the network only as needed, reducing communication overhead and improving scalability characteristics. The mesh topology may enable logarithmic lookup capabilities where agents can efficiently locate target destinations through distributed search algorithms that leverage the interconnected structure of agent network 200. Each agent node may maintain local routing tables that contain information about neighboring nodes and optimal pathways to frequently accessed destinations, enabling rapid route selection without requiring global network state synchronization.

The autonomous routing system may provide mechanisms for receiving and processing execution requests that specify actions to be completed by artificial intelligence agents within the distributed computing environment. The system may enable users, applications, or other automated systems to submit requests for task completion without requiring detailed knowledge of individual agent capabilities or network topology. The autonomous routing system may receive a prompt for completing an action using one or more artificial intelligence agents of a plurality of artificial intelligence agents. For example, the autonomous routing system may implement request processing modules that parse incoming prompts, validate request parameters, and extract action specifications that define the computational tasks to be performed by selected agents.

Each artificial intelligence agent participating in the distributed system may maintain specialized computational capabilities through associated operation sets that define the scope of actions the agent can perform autonomously. The system may implement a framework where each artificial intelligence agent of the plurality of artificial intelligence agents may be associated with a corresponding computer-executable operation set configured to be autonomously executed by a corresponding artificial intelligence agent on a software application set. The computer-executable operation sets may include compiled code modules, interpreted scripts, machine learning models, or other executable components that enable agents to perform specific computational tasks without human intervention. For example, an agent may be associated with operation sets that include natural language processing algorithms for text analysis, image recognition models for visual data processing, or database query engines for information retrieval operations.

The software application sets associated with each agent may provide the runtime environments and supporting infrastructure needed to execute the computer-executable operation sets effectively. These software application sets may include operating system components, runtime libraries, database connections, network communication protocols, and other system resources that enable agents to perform their designated operations. In some implementations, the software application sets may be containerized environments that provide isolated execution contexts for agent operations while maintaining access to shared system resources. The autonomous routing system may maintain registries that map individual agents to their corresponding operation sets and software application environments, enabling the system to determine which agents are capable of performing specific requested actions.

The prompt structure may include various components that specify the nature of the requested action, performance requirements, and any constraints or preferences for task execution. Prompts may contain action identifiers that specify the type of computational task to be performed, input parameters that provide data or configuration information needed for task execution, and quality requirements that define acceptable performance thresholds for successful completion. The autonomous routing system may implement prompt validation mechanisms that verify the completeness and correctness of received requests before initiating the agent selection process. In some cases, prompts may include priority levels that influence routing decisions, timeout specifications that define maximum acceptable execution times, and callback information that enables the system to return results to the requesting entity upon task completion.

The autonomous routing system may implement capability assessment mechanisms that evaluate which artificial intelligence agents possess the operational capacity to perform requested computational tasks. The system may analyze agent specifications and operational parameters to identify suitable candidates for task execution based on their registered skill sets and functional capabilities. The autonomous routing system may determine a set of artificial intelligence agents from the plurality of artificial intelligence agents that are enabled to complete the action. For example, the system may query agent registries that contain detailed capability profiles for each participating agent, cross-reference the requested action requirements against available agent skill sets, and generate filtered lists of qualified agents based on matching operational parameters and performance thresholds.

The capability determination process may involve multidimensional evaluation criteria that assess various aspects of agent suitability for specific computational tasks. The system may examine technical specifications including supported programming languages, available computational resources, memory capacity, and processing power to determine whether individual agents can handle the computational demands of requested actions. The agent selection subsystem may evaluate routes using multi-criteria optimization including multi-hop latency measurements, available bandwidth estimation, historical reliability data, economic cost, and security trust scores. The system may implement scoring algorithms that weigh different capability factors based on action requirements, enabling the system to rank potential agents according to their suitability for specific tasks while considering performance constraints and quality requirements.

The filtering mechanisms may incorporate dynamic assessment procedures that account for real-time agent availability and current operational status. The system may monitor agent workloads, resource utilization levels, and current task assignments to determine whether individual agents have sufficient capacity to accept additional computational tasks without compromising performance quality. The capability evaluation process may include verification procedures that confirm agent operational status through health checks, connectivity tests, and response time measurements to ensure selected agents remain accessible and functional at the time of task assignment. The system may maintain updated capability matrices that reflect changes in agent configurations, software updates, and operational modifications that could affect task execution capabilities.

The system may implement hierarchical filtering approaches that progressively narrow the agent selection pool through multiple evaluation stages. Initial filtering may eliminate agents that lack fundamental capabilities needed for the requested action, such as missing software dependencies, insufficient computational resources, or incompatible operational environments. Secondary filtering may apply performance-based criteria that consider historical success rates, average execution times, and reliability metrics to identify agents with demonstrated competency in similar computational tasks. The final selection process may incorporate contextual factors including current system load, geographic distribution preferences, and cost optimization parameters to determine the optimal subset of qualified agents for task execution while maintaining system efficiency and performance standards.

The autonomous routing system may implement comprehensive data access mechanisms that enable retrieval and analysis of historical performance information for artificial intelligence agents participating in the distributed computing environment. The system may maintain detailed records of agent activities and task completion outcomes to support informed routing decisions based on empirical performance data rather than theoretical capabilities alone. The autonomous routing system may access a set of action completion datasets for the set of artificial intelligence agents, where these datasets contain comprehensive historical information about agent performance across various computational tasks. For example, the system may implement database query engines that execute structured query language (SQL) commands to retrieve performance records from distributed storage systems, apply filtering criteria based on agent identifiers and action types, and aggregate results into actionable intelligence for routing optimization algorithms.

Figure 3:
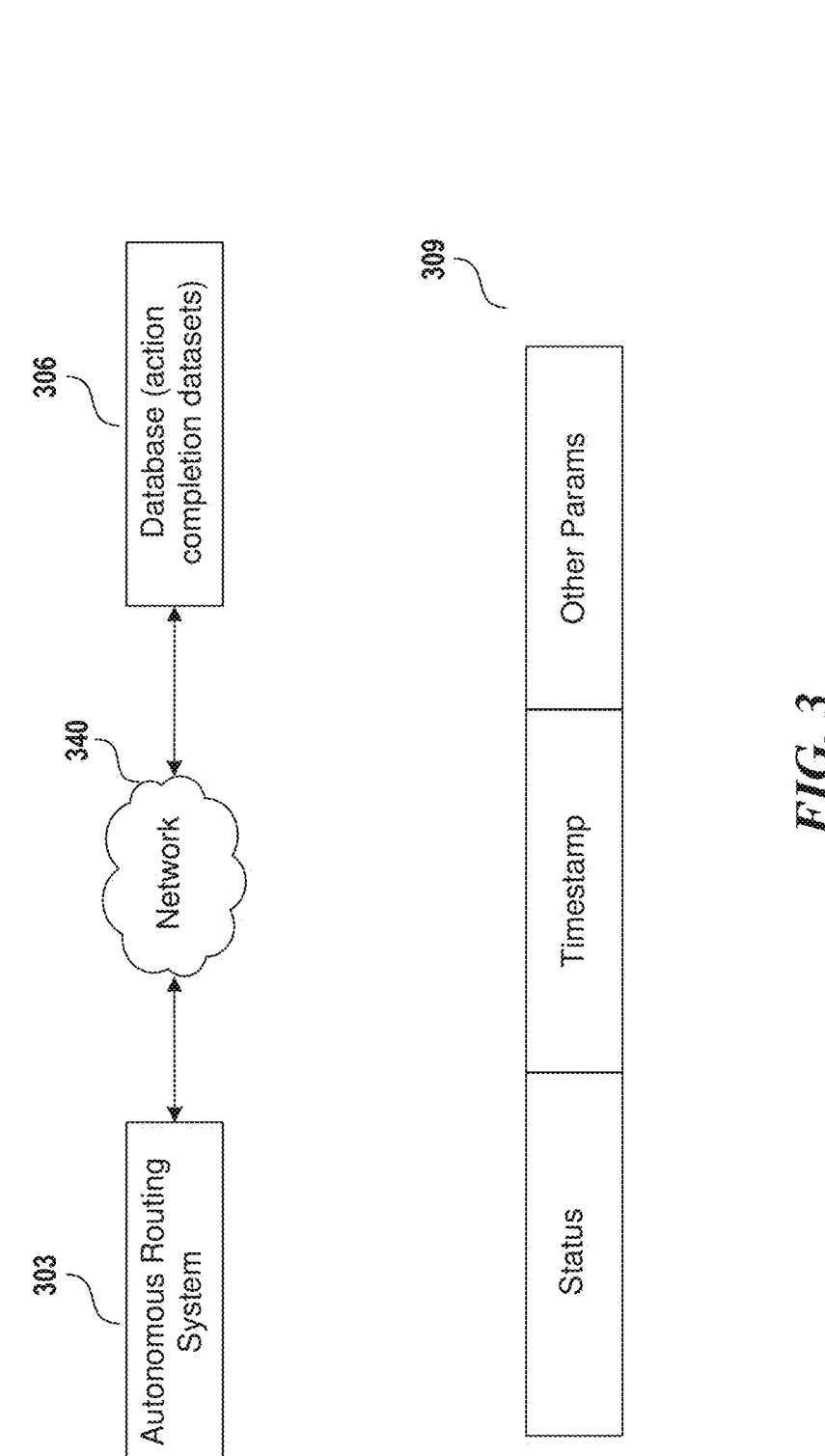
FIG. 3 illustrates autonomous routing system communications with database systems, in accordance with one or more embodiments of this disclosure.

Referring to FIG. 3, a data environment 300 may provide the infrastructure framework for storing and managing historical performance data associated with artificial intelligence agent operations within the distributed computing system. Data environment 300 may implement scalable storage architectures that accommodate large volumes of performance metrics, execution logs, and outcome data generated by numerous agents operating across extended time periods. Data environment 300 may support various data storage technologies including relational databases, distributed file systems, and blockchain-based storage mechanisms to ensure data persistence, integrity, and accessibility for routing decision processes. Data Environment 300 may implement data partitioning strategies that organize performance records by agent identifiers, action types, and temporal ranges to optimize query performance and reduce data retrieval latency during routing operations.

Autonomous routing system 303 within the data environment 300 may coordinate data access operations and manage communication with storage systems that contain agent performance histories. Autonomous routing system 303 may implement data access protocols that enable secure and efficient retrieval of performance metrics while maintaining system scalability and response time requirements. Autonomous routing system 303 may execute complex queries that span multiple data sources and aggregate performance information from various storage systems to provide comprehensive views of agent capabilities and historical success patterns. Autonomous routing system 303 may also implement caching mechanisms that store frequently accessed performance data in high-speed memory systems to reduce database query overhead and improve routing decision response times during periods of high system activity.

The system may interface with specialized storage systems that maintain comprehensive records of agent task completion activities and associated performance metrics. Action completion database 306 may store detailed information about individual task executions including performance measurements, outcome indicators, and contextual information that characterizes the circumstances surrounding each completed action. Action completion database 306 may implement data schemas that organize performance records according to agent identifiers, action classifications, and temporal sequences to support efficient querying and analysis operations. Action completion database 306 may maintain data integrity through transaction management systems that ensure consistency across concurrent read and write operations while supporting high-throughput data access patterns generated by multiple routing systems operating simultaneously.

Autonomous routing system 303 may communicate with action completion database 306 through a communication network 340 that provides reliable data transmission capabilities and supports various communication protocols for database access operations. Communication network 340 may implement secure communication channels that protect sensitive performance data during transmission between routing systems and storage infrastructure while maintaining low-latency access characteristics needed for real-time routing decisions. Communication network 340 may support load balancing mechanisms that distribute database queries across multiple network pathways to prevent communication bottlenecks and ensure consistent data access performance during periods of high system utilization. Communication network 340 may implement fault tolerance mechanisms that maintain database connectivity despite individual network component failures through redundant communication pathways and automatic failover procedures.

The system may structure performance data according to standardized formats that enable consistent interpretation and analysis across different routing system implementations and agent configurations. Each action completion dataset may include a corresponding plurality of action parameters for a plurality of actions completed by each artificial intelligence agent. These action parameters may encompass various dimensions of task execution including computational resource utilization, execution duration, output quality metrics, and environmental conditions that influenced task performance outcomes. For example, the system may store action parameters that include CPU utilization percentages during task execution, memory consumption patterns throughout the computational process, network bandwidth requirements for data transfer operations, and disk input/output statistics that characterize storage system interactions during task completion activities.

The performance data structure may incorporate temporal information and outcome indicators that enable the routing system to assess agent reliability and predict future performance characteristics based on historical patterns. Each plurality of parameters may include a corresponding status parameter indicating whether a corresponding action was completed successfully. The status parameter may encode various completion states including successful task completion, partial completion with acceptable results, task failure due to computational errors, timeout conditions that prevented task completion within specified time limits, and resource exhaustion scenarios where insufficient computational resources prevented successful task execution. For example, the system may implement status encoding schemes that use numerical codes to represent different completion outcomes, with successful completions assigned positive values, partial completions assigned intermediate values, and various failure modes assigned negative values that correspond to specific error categories.

The temporal dimension of performance data may provide chronological context that enables the routing system to identify performance trends, seasonal patterns, and degradation indicators that could influence future routing decisions. Each plurality of parameters may include a corresponding timestamp of when the corresponding action was completed. The timestamp information may include precise temporal markers that record task initiation times, intermediate milestone achievements, and final completion moments to enable detailed analysis of task execution patterns and performance characteristics. For example, the system may store timestamp data using coordinated universal time (UTC) formats with microsecond precision to enable accurate performance comparisons across different geographic regions and time zones, implement temporal indexing mechanisms that optimize query performance for time-based data retrieval operations, and maintain time-stamp integrity through network time protocol (NTP) synchronization procedures that ensure consistent temporal references across distributed system components.

The system may implement structured data exchange mechanisms that facilitate communication between routing systems and storage infrastructure while maintaining data consistency and transmission reliability. An action completion database update request 309 may provide a standardized format for transmitting performance data and query operations between autonomous routing system 303 and action completion database 306 through communication network 340. Action completion database update request 309 may include multiple data fields that specify the nature of database operations, provide authentication credentials for secure access, and contain performance data or query parameters needed for database interactions. The action completion database update request 309 may implement data validation mechanisms that verify the completeness and correctness of transmitted information before database operations are executed, ensuring data integrity and preventing corruption of stored performance records through malformed or incomplete data submissions.

The autonomous routing system may implement blockchain-based infrastructure mechanisms that provide persistent storage and identity management capabilities for artificial intelligence agents participating in the distributed computing environment. The system may leverage blockchain technology to maintain tamper-resistant records of agent performance data while establishing cryptographically verifiable identity frameworks that enable secure authentication and data attribution across the distributed network. The blockchain infrastructure may support comprehensive tracking of agent activities and task completion outcomes through immutable ledger systems that preserve historical performance information for extended periods without risk of data manipulation or unauthorized modification.

Figure 4:
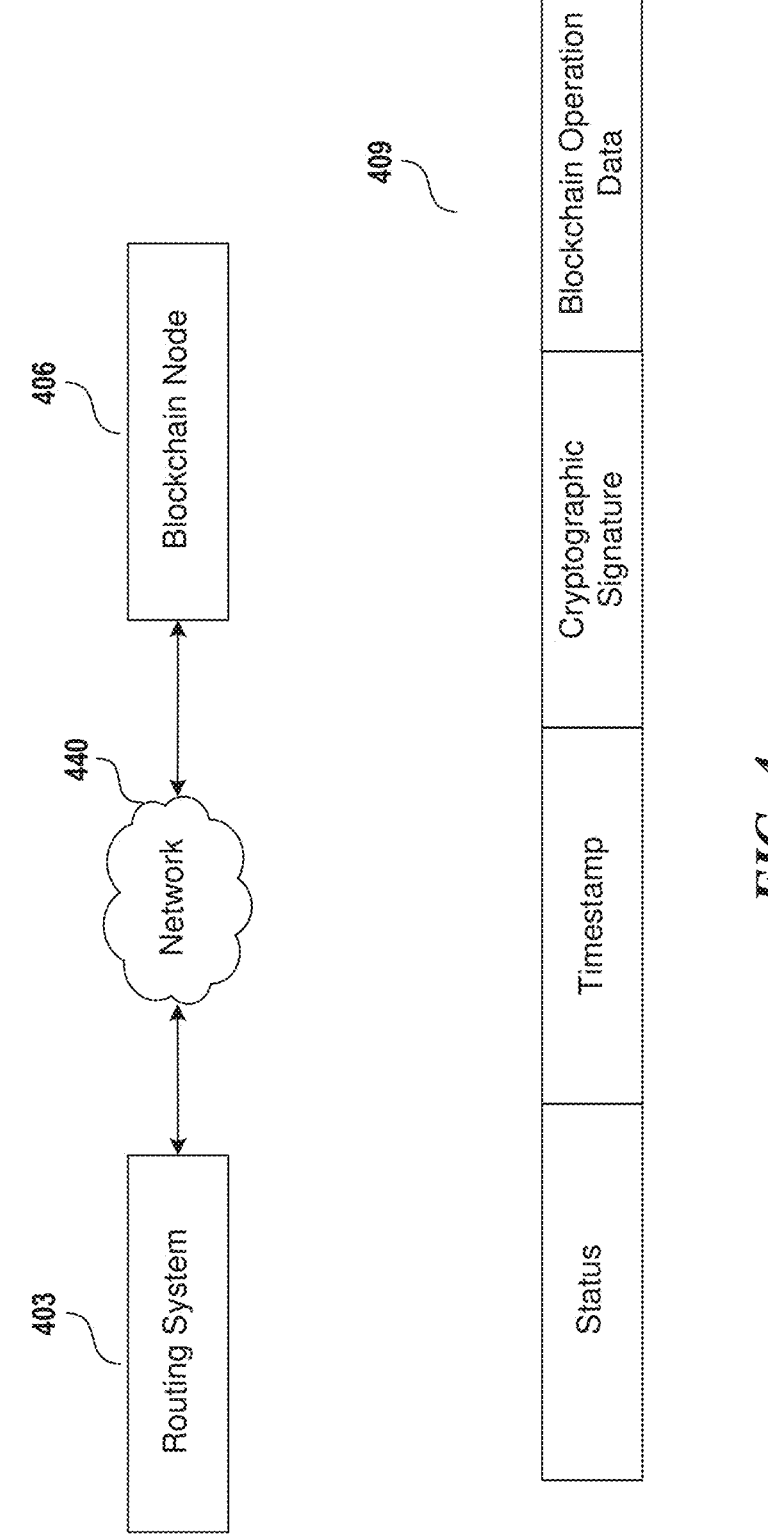
FIG. 4 illustrates autonomous routing system communications with blockchain systems, in accordance with one or more embodiments of this disclosure.

Referring to FIG. 4, a blockchain data environment 400 may provide the foundational infrastructure for implementing distributed ledger capabilities that support agent identity management and performance data storage within the autonomous routing system. Blockchain data environment 400 may establish a framework where multiple blockchain nodes operate collectively to maintain synchronized copies of performance records and identity information across geographically distributed locations. Blockchain data environment 400 may implement consensus mechanisms that ensure data consistency and integrity across all participating nodes while supporting high-throughput data access patterns generated by numerous agents operating simultaneously throughout the distributed computing system. Blockchain data environment 400 may support both permissioned and permissionless configurations and may utilize existing blockchain infrastructure or deploy dedicated blockchain optimized for routing metadata.

Autonomous routing system 403 within blockchain data environment 400 may coordinate blockchain operations and manage interactions with distributed ledger infrastructure to facilitate agent identity verification and performance data retrieval processes. Autonomous routing system 403 may implement blockchain client protocols that enable communication with various blockchain networks while maintaining compatibility with different consensus mechanisms and data storage formats. Autonomous routing system 403 may execute cryptographic operations including digital signature generation, hash computation, and merkle tree verification to ensure data integrity and authenticity during blockchain interactions. Furthermore, autonomous routing system 403 may support different consensus mechanisms including Proof of Stake for public blockchains, Practical Byzantine Fault Tolerance for private networks, and novel Proof of Routing where agents earn validation rights through successful routing.

The system may interface with specialized blockchain infrastructure components that maintain distributed copies of performance data and identity records across multiple network locations. Blockchain node 406 may store and validate blockchain transactions that contain agent performance metrics, identity information, and routing coordination data within the distributed ledger system. Blockchain node 406 may implement consensus protocols that coordinate with other blockchain nodes to maintain synchronized data states and validate new transactions before committing them to the permanent blockchain record. Blockchain node 406 may provide query interfaces that enable autonomous routing system 403 to retrieve historical performance data and identity information through structured database operations that leverage blockchain indexing mechanisms for efficient data access. In addition, blockchain node 406 may maintain local copies of blockchain data while participating in distributed consensus processes that ensure global data consistency across all participating nodes in the blockchain network.

Autonomous routing system 403 may communicate with blockchain node 406 through network 440 that provides reliable data transmission capabilities and supports various blockchain communication protocols for transaction submission and data retrieval operations. Network 440 may implement secure communication channels that protect sensitive blockchain operations during transmission between routing systems and blockchain infrastructure while maintaining low-latency access characteristics needed for real-time identity verification and performance data queries. Network 440 may support load balancing mechanisms that distribute blockchain operations across multiple network pathways to prevent communication bottlenecks and ensure consistent blockchain access performance during periods of high system utilization. Furthermore, network 440 may implement fault tolerance mechanisms that maintain blockchain connectivity despite individual network component failures through redundant communication pathways and automatic failover procedures that redirect blockchain operations to alternative network routes when primary connections become unavailable.

The system may structure blockchain operations according to standardized data formats that enable consistent interpretation and processing across different blockchain implementations and routing system configurations. Blockchain operation data 409 may provide a structured format for encoding agent performance metrics, identity information, and routing coordination data within blockchain transactions that can be processed by blockchain node 406 and other distributed ledger components. Blockchain operation data 409 may include multiple data fields that specify the nature of blockchain operations, provide cryptographic signatures for authentication, and contain performance data or identity parameters needed for blockchain storage and retrieval operations. Blockchain operation data 409 may be subjected to data validation mechanisms that verify the completeness and correctness of transmitted information before blockchain operations are executed, ensuring data integrity and preventing corruption of stored records through malformed or incomplete data submissions.

The autonomous routing system may implement comprehensive identity management mechanisms that establish cryptographically verifiable identifiers for artificial intelligence agents participating in the distributed computing environment. The system may derive agent identities from cryptographic key pairs that provide both authentication capabilities and unique identification characteristics within the blockchain infrastructure. The autonomous routing system may determine for each artificial intelligence agent, based on a corresponding public key associated with each artificial intelligence agent, a corresponding blockchain identifier that identifies each artificial intelligence agent on a blockchain. For example, the system may implement cryptographic hash functions that process agent public keys through secure hash algorithm (SHA) operations to generate deterministic blockchain identifiers, apply elliptic curve cryptography principles to derive unique agent addresses from public key coordinates, and implement base 58 encoding schemes that convert binary hash outputs into human-readable blockchain addresses suitable for transaction processing and data retrieval operations.

The public key infrastructure may provide the foundation for establishing secure agent identities that can be verified independently by any participant in the distributed system without requiring centralized authentication authorities. Each artificial intelligence agent may generate a cryptographic key pair including a private key for signing operations and a corresponding public key for identity verification and blockchain address derivation. The public keys may serve as the basis for creating blockchain identifiers through deterministic mathematical operations that ensure consistent identity mapping across different system components and time periods. The system may implement key derivation functions that apply cryptographic transformations to public key data, generating blockchain addresses that serve as permanent identifiers for agents within the distributed ledger system while maintaining the cryptographic properties needed for secure authentication and data attribution.

The blockchain identifier derivation process may incorporate various cryptographic techniques that ensure unique identifiers and prevent collision scenarios where multiple agents could generate identical blockchain addresses. The system may apply multiple rounds of cryptographic hashing to public key data, implement checksum mechanisms that detect identifier corruption or transmission errors, and utilize cryptographic salt values that enhance identifier entropy and prevent rainbow table attacks against agent identities. The blockchain identifiers may serve as primary keys within the distributed ledger system, enabling efficient indexing and retrieval of agent-specific performance data while maintaining the cryptographic verifiability needed for secure identity authentication across the distributed computing environment.

The system may implement sophisticated data retrieval mechanisms that enable efficient access to historical performance information stored within distributed blockchain infrastructure. The autonomous routing system may execute structured query operations that leverage blockchain indexing capabilities to locate and retrieve performance records associated with specific agent identities. The autonomous routing system may transmit a search operation to a blockchain node. The search operation may include specific agent identifiers and query parameters that define the scope and criteria for data retrieval operations within the distributed ledger system. For example, the system may construct search operations that include agent blockchain addresses as primary search keys, specify temporal ranges for filtering historical performance data, and define performance metric categories for selective data retrieval that reduces network bandwidth consumption and improves query response times.

The search operation structure may incorporate multiple query parameters that enable precise specification of data retrieval requirements while optimizing blockchain query performance and resource utilization. The search operation may include each corresponding blockchain identifier for each artificial intelligence agent. The blockchain identifiers may serve as primary search keys that enable blockchain node 406 to locate relevant performance records within the distributed ledger system through indexed lookup operations that leverage blockchain data structures for efficient data access. The search operations may include temporal filters that specify time ranges for historical data retrieval, performance metric selectors that define which types of performance data should be included in query results, and result formatting parameters that specify the structure and organization of returned data sets to facilitate processing by autonomous routing system 403.

The blockchain query processing mechanisms may implement various optimization techniques that enhance data retrieval performance while maintaining the security and integrity characteristics of the distributed ledger system. Blockchain node 406 may utilize merkle tree structures that enable efficient verification of query results without requiring transmission of complete blockchain data sets, implement caching mechanisms that store frequently accessed performance records in high-speed memory systems, and apply parallel processing techniques that distribute query operations across multiple processing cores to reduce response times for complex data retrieval operations. The query results may include cryptographic proofs that enable autonomous routing system 403 to verify the authenticity and completeness of retrieved performance data without requiring direct access to the complete blockchain ledger, ensuring data integrity while minimizing network communication overhead during performance data analysis and routing decision processes.

The autonomous routing system may implement sophisticated agent selection mechanisms that evaluate artificial intelligence agents based on quantitative performance metrics derived from historical task completion data. The system may analyze patterns of successful task execution and temporal performance characteristics to identify agents that demonstrate consistent reliability and efficient execution capabilities across various computational tasks. The autonomous routing system may select, based on a corresponding frequency composite parameter generated based on each status parameter indicating successfully completing the corresponding action and a time composite parameter indicating a time of successfully completing the corresponding action, an artificial intelligence agent of the set of artificial intelligence agents to complete the action. For example, the system may implement statistical analysis algorithms that process historical performance records stored in distributed databases, calculate weighted performance scores based on success rates and execution times, and apply multi-criteria decision algorithms that balance reliability metrics against efficiency requirements to identify optimal agent candidates for specific computational tasks.

The frequency composite parameter may represent the reliability of an AI agent in successfully completing assigned tasks. In one example, this parameter may be calculated using a weighted success rate formula: $FCP = (\Sigma$ $(S_i \times W_i))/(\Sigma W_i)$, where $S_i$ represents each individual status parameter (1 for success, 0 for failure) and $W_i$ represents a time-based weight that gives greater importance to recent successes. For example, $$W_i = e^{-\lambda(t_{now} - t_i)},$$

where A is a decay constant and $(t_{now} - t_i)$ is the time elapsed since the action. This calculation may ensure that agents with consistent recent success receive higher scores, while accounting for performance improvements over time.

The time composite parameter may represent the temporal efficiency of an AI agent in completing assigned tasks. This parameter is calculated using a time-weighted average formula: $TCP = (\Sigma(t_i \times W_i))/(\Sigma W_i)$, where $t_i$ represents each individual timestamp of a successful execution and $W_i$ represents a recency weight that gives greater importance to more recent successful executions. The recency weight may be calculated as $W_i = (t_i - t_{min})/(t_{now} - t_{min})$, where $t_{min}$ is the earliest timestamp in the dataset and $t_{now}$ is the current time. This weighting scheme ensures that agents demonstrating recent successful task completion receive higher priority in the selection process, while still accounting for their historical performance patterns. When combined with the frequency composite parameter, this creates a comprehensive evaluation metric that balances both reliability and temporal efficiency in agent selection.

In some implementations, the system may implement comprehensive data retrieval processes that gather detailed performance information for all qualified agents within the candidate selection pool. The autonomous routing system may retrieve a plurality of status parameters for each artificial intelligence agent and corresponding timestamps from distributed storage systems that maintain comprehensive records of agent task execution activities. The status parameters may encode various completion outcomes including successful task execution, partial completion with acceptable results, and failure conditions that prevented successful task completion within specified performance thresholds. For example, the system may execute database queries that filter performance records based on agent identifiers and action types, retrieve status codes that indicate task completion outcomes using standardized encoding schemes, and collect timestamp data that records precise temporal information about task initiation times, execution durations, and completion moments using coordinated universal time formats with microsecond precision to enable accurate performance comparisons across different geographic regions and operational contexts.

The autonomous routing system may implement aggregation algorithms that transform individual performance records into composite metrics that characterize agent capabilities and performance patterns across multiple task execution instances. The system may aggregate, for each artificial intelligence agent in the set of artificial intelligence agents, a corresponding plurality of status parameter indicating successfully completing the corresponding action into the corresponding frequency composite parameter, and a corresponding plurality of timestamps into the time composite parameter. The frequency composite parameter may represent the proportion of successful task completions relative to total task attempts, calculated through statistical methods that weigh recent performance more heavily than historical data to account for agent improvements and environmental changes. For example, the system may implement exponential decay functions that assign higher weights to recent performance data, calculate success ratios using sliding window techniques that focus on performance within specified time periods, and apply confidence interval calculations that account for statistical significance based on the number of available performance samples to ensure reliable frequency estimates for agents with varying levels of historical activity.

The time composite parameter aggregation process may analyze temporal performance characteristics to identify agents that demonstrate consistent efficiency in task execution across various operational conditions. The system may process timestamp data to calculate average execution times, identify performance trends that indicate improving or degrading efficiency patterns, and compute variability metrics that characterize the consistency of agent performance across multiple task instances. The temporal analysis may incorporate various statistical measures including median execution times that reduce the influence of outlier performance events, standard deviation calculations that quantify performance consistency, and percentile-based metrics that characterize typical performance ranges while accounting for occasional performance variations due to system load or resource availability fluctuations.

The autonomous routing system may implement multicriteria optimization algorithms that combine frequency and temporal performance metrics to identify agents that provide optimal combinations of reliability and efficiency for specific computational tasks. The system may select the artificial intelligence agent based on a combination of a highest frequency composite parameter and a shortest time composite parameter through decision algorithms that balance competing performance objectives. The selection process may incorporate weighted scoring mechanisms that assign relative importance values to reliability and efficiency metrics based on task requirements and system priorities. For example, the system may implement Pareto optimization techniques that identify agents representing optimal tradeoffs between success rates and execution times, apply fuzzy logic algorithms that handle uncertainty in performance predictions based on limited historical data, and utilize machine learning models that predict future agent performance based on historical patterns and current system conditions to enhance selection accuracy and adapt to changing operational environments over extended time periods.

The autonomous routing system may implement parameter identification mechanisms that determine the specific data inputs and configuration settings needed by selected artificial intelligence agents to execute requested computational tasks effectively. The system may analyze agent specifications and task requirements to identify the precise parameters that must be provided to enable successful task completion without missing dependencies or providing unnecessary information that could impact performance. The autonomous routing system may identify a set of parameters required by the artificial intelligence agent to complete the action through analysis of agent capability profiles, task specification documents, and interface definitions that describe the expected input formats and data structures. For example, the system may parse agent metadata files that contain parameter specifications using extensible markup language (XML) or JavaScript object notation (JSON) formats, cross-reference task requirements against agent input schemas to identify matching parameter categories, and validate parameter completeness through schema validation algorithms that verify all mandatory inputs are available before task transmission occurs.

The parameter identification process may incorporate dynamic analysis mechanisms that account for contextual factors and environmental conditions that could influence the specific parameters needed for optimal task execution. The system may evaluate current system conditions including available computational resources, network bandwidth limitations, and concurrent task loads to determine whether additional configuration parameters should be included to optimize agent performance under current operational circumstances. The parameter identification algorithms may implement dependency resolution mechanisms that identify indirect parameter requirements based on the primary task specifications, ensuring that all supporting data and configuration settings are included in the parameter set to prevent task execution failures due to missing dependencies. The system may maintain parameter template libraries that contain standardized parameter sets for common task categories, enabling rapid parameter identification for frequently requested actions while supporting customization for specialized computational requirements.

The system may implement comprehensive parameter validation and formatting mechanisms that ensure identified parameters conform to agent-specific requirements and communication protocols before transmission occurs. The parameter preparation process may include data type conversion operations that transform parameter values into formats expected by the target agent, validation procedures that verify parameter values fall within acceptable ranges and conform to specified constraints, and serialization operations that encode parameter data into transmission-ready formats compatible with agent communication interfaces. The system may apply parameter optimization techniques that reduce data transmission overhead by eliminating redundant information, compressing parameter data using appropriate encoding schemes, and organizing parameters according to priority levels that enable agents to begin processing while additional parameters are still being transmitted for complex computational tasks with extensive parameter requirements.

The autonomous routing system may implement sophisticated transmission mechanisms that deliver parameter sets to selected artificial intelligence agents through secure and reliable communication channels optimized for the specific requirements of each agent and task combination. The system may establish communication sessions with target agents using appropriate network protocols and authentication mechanisms to ensure secure parameter delivery and prevent unauthorized access to sensitive task data. The autonomous routing system may transmit the set of parameters to the artificial intelligence agent through communication protocols that support various data formats, transmission methods, and delivery confirmation mechanisms tailored to agent specifications and network conditions. For example, the system may establish secure socket layer (SSL) connections for encrypted parameter transmission, implement hypertext transfer protocol (HTTP) post operations for web-based agent interfaces, or utilize message queue protocols for asynchronous parameter delivery that enables agents to process parameters when computational resources become available.

The parameter transmission process may incorporate adaptive delivery mechanisms that optimize transmission performance based on network conditions, parameter data characteristics, and agent processing capabilities. The system may implement streaming transmission protocols for large parameter sets that enable agents to begin processing while additional parameter data is still being transmitted, reducing overall task initiation latency and improving system responsiveness. The transmission mechanisms may include error detection and recovery procedures that monitor parameter delivery status, detect transmission failures or data corruption events, and automatically retry parameter transmission using alternative network pathways or communication protocols when primary delivery methods encounter difficulties. The system may implement delivery confirmation protocols that require agents to acknowledge successful parameter reception and validation before task execution begins, ensuring parameter integrity and preventing task failures due to incomplete or corrupted parameter data that could compromise computational accuracy or system stability.

The autonomous routing system may implement comprehensive security frameworks that protect against various attack vectors and ensure the integrity of communications between artificial intelligence agents within the distributed computing environment. The security architecture may establish multiple layers of protection that collectively address authentication, authorization, data integrity, and privacy concerns while maintaining the decentralized nature of the swarm intelligence routing mechanisms. The system may deploy cryptographic protocols that enable secure identity verification without relying on centralized authentication authorities, implement reputation-based trust mechanisms that evaluate agent reliability based on historical behavior patterns, and provide attack resistance capabilities that detect and mitigate various forms of malicious activity including identity spoofing, data manipulation, and network disruption attempts.

The cryptographic authentication mechanisms may provide the foundation for secure agent identity verification and message integrity validation throughout the distributed system. The autonomous routing system may implement digital signature schemes that enable agents to cryptographically sign their communications using private keys associated with their blockchain identities, ensuring that message recipients can verify both the authenticity of the sender and the integrity of transmitted data. The system may utilize elliptic curve digital signature algorithm (ECDSA) implementations that provide strong cryptographic security while maintaining computational efficiency suitable for real-time routing operations, apply secure hash functions including SHA-256 algorithms to generate message digests that detect any unauthorized modifications to transmitted data, and implement public key infrastructure mechanisms that enable distributed verification of agent identities without requiring centralized certificate authorities or trust management systems.

The message authentication process may incorporate sophisticated verification procedures that validate both the cryptographic signatures and the contextual authenticity of received communications. The autonomous routing system may receive a message from the artificial intelligence agent including a completion status associated with the action. The message may include one or more status parameters associated with the completion status and a cryptographic signature associated with the artificial intelligence agent. The cryptographic signature may be generated using a private key associated with the artificial intelligence agent, where the private key may be associated with a public key derivable from a blockchain identifier associated with the artificial intelligence agent. For example, the system may implement signature verification algorithms that extract public keys from blockchain records using agent identifiers as lookup keys, apply cryptographic verification functions that validate digital signatures against message content and sender public keys, and execute timestamp validation procedures that ensure message freshness and prevent replay attacks where previously captured messages could be retransmitted by malicious actors to disrupt system operations.

The blockchain-based identity verification mechanisms may enable the autonomous routing system to retrieve and validate agent public keys through distributed ledger queries that provide tamper-resistant access to identity information. The system may retrieve, using a blockchain node from a blockchain, the public key associated with the artificial intelligence agent through structured queries that locate identity records based on blockchain identifiers derived from agent addresses. The blockchain retrieval process may implement merkle proof verification that enables efficient validation of retrieved public key data without requiring complete blockchain downloads, utilize distributed hash table mechanisms that provide redundant access to identity information across multiple blockchain nodes, and apply cryptographic verification procedures that ensure retrieved public keys correspond to the claimed agent identities through mathematical relationships between private keys, public keys, and blockchain addresses that prevent identity spoofing attempts.

The message verification procedures may combine cryptographic signature validation with contextual authentication checks that ensure the legitimacy and integrity of received communications. The autonomous routing system may verify the message using the private key and the cryptographic signature through mathematical operations that confirm the digital signature was generated by the holder of the private key corresponding to the retrieved public key. The verification process may implement elliptic curve signature verification algorithms that validate the mathematical relationship between the message content, digital signature, and public key parameters, apply hash function verification that ensures message integrity by comparing computed message digests against signed hash values, and execute signature format validation that confirms digital signatures conform to expected cryptographic standards and encoding schemes to prevent malformed signature attacks that could bypass security controls.

The reputation system mechanisms may provide behavioral-based trust evaluation capabilities that assess agent reliability and detect potentially malicious actors based on historical performance patterns and community feedback. The autonomous routing system may maintain distributed reputation databases that track agent behavior metrics including task completion rates, response time consistency, and peer evaluation scores collected from other agents that have interacted with each participant in the distributed system. The reputation calculations may implement weighted scoring algorithms that assign higher trust values to agents with consistent positive performance histories while applying penalties for detected malicious behavior, failed task completions, or suspicious activity patterns that deviate from expected operational norms. The system may utilize collaborative filtering techniques that aggregate reputation assessments from multiple sources to reduce the impact of individual biased evaluations and provide more accurate trust assessments for routing decisions.

The Sybil attack resistance mechanisms may prevent malicious actors from creating multiple fake identities to manipulate routing decisions or overwhelm system resources through identity proliferation attacks. The autonomous routing system may implement proof-of-work or proof-of-stake requirements that impose computational or economic costs for creating new agent identities, making large-scale identity creation economically infeasible for attackers while allowing legitimate agents to establish identities through reasonable resource expenditure. The system may apply identity verification procedures that require new agents to demonstrate legitimate computational capabilities through challenge-response protocols, implement rate limiting mechanisms that restrict the frequency of new identity creation from individual network addresses, and utilize social proof mechanisms that require existing trusted agents to vouch for new participants before granting full system access privileges.

The route poisoning prevention capabilities may detect and mitigate attempts by malicious agents to provide false routing information that could degrade system performance or redirect communications to unauthorized destinations. The autonomous routing system may implement statistical anomaly detection algorithms that identify routing recommendations that deviate significantly from established performance patterns or contradict information provided by multiple trusted sources. The system may apply cross-validation mechanisms that verify routing information against multiple independent sources before incorporating new route data into routing decisions, implement temporal consistency checks that detect sudden changes in reported route performance that could indicate manipulation attempts, and utilize consensus mechanisms that require agreement from multiple trusted agents before accepting routing updates that could significantly impact system behavior.

The privacy preservation mechanisms may provide optional anonymity capabilities that protect sensitive communication patterns while maintaining the routing functionality needed for effective agent coordination. The autonomous routing system may implement onion routing protocols that encrypt communications through multiple layers of cryptographic protection, enabling messages to traverse multiple intermediate agents without revealing the ultimate source or destination to any individual routing participant. The onion routing implementation may utilize layered encryption schemes where each routing hop can decrypt only the information needed to forward the message to the next destination while keeping the complete routing path confidential, apply random path selection algorithms that vary routing paths for similar communications to prevent traffic analysis attacks, and implement timing obfuscation techniques that introduce random delays to prevent correlation attacks based on message timing patterns.

The blockchain operation security mechanisms may ensure the integrity and authenticity of performance data and routing information stored within the distributed ledger system. The autonomous routing system may generate a blockchain operation including the one or more status parameters received from the artificial intelligence agent. The blockchain operation may be cryptographically signed by a private key associated with the agent routing system to provide authentication and prevent unauthorized modification of stored performance data. The system may transmit the blockchain operation to a blockchain node, where the blockchain node commits the blockchain operation to a blockchain through consensus mechanisms that validate the cryptographic signatures and ensure data integrity across the distributed ledger network. The blockchain storage process may implement transaction validation procedures that verify the authenticity of submitted operations, apply consensus protocols that require agreement from multiple blockchain nodes before committing new data to the permanent ledger, and utilize cryptographic hash chaining that creates tamper-evident records where any unauthorized modifications to stored data would be immediately detectable through hash verification procedures.

The autonomous routing system may implement comprehensive discovery mechanisms that continuously monitor the distributed computing environment to identify newly available artificial intelligence agents that could participate in the routing network. The system may establish monitoring processes that scan network interfaces, service registries, and communication channels to detect agent availability signals and registration requests from agents seeking to join the distributed system. The autonomous routing system may detect availability of a new plurality of artificial intelligence agents through various discovery protocols including network broadcast monitoring that identifies agents announcing their presence on local network segments, service discovery protocol implementations that enable agents to register their availability through standardized announcement mechanisms, and peer-to-peer discovery networks that facilitate agent identification through distributed hash table lookups and gossip protocol propagation. For example, the system may implement multicast domain name system (mDNS) monitoring that detects service announcements broadcast by newly activated agents, utilize zero-configuration networking protocols that enable automatic discovery of network-connected agents without manual configuration requirements, and deploy network scanning algorithms that periodically probe network address ranges to identify newly accessible agent endpoints that may have recently joined the distributed computing environment.

The system may implement sophisticated capability assessment procedures that analyze newly discovered agents to determine their operational capacities and functional specializations within the distributed computing framework. The discovery process may involve comprehensive evaluation of agent specifications, supported protocols, and computational capabilities to establish accurate capability profiles for routing decision processes. The autonomous routing system may determine, for each new artificial intelligence agent of the new plurality of artificial intelligence agents, a corresponding set of actions enabled to be performed by each new artificial intelligence agent through analysis of agent metadata, interface specifications, and capability declarations provided during the registration process. The capability determination algorithms may parse agent configuration files that contain detailed specifications of supported operations using structured data formats including extensible markup language schemas and JavaScript object notation documents, execute capability verification procedures that test agent responsiveness to sample requests and validate claimed operational capacities, and implement compatibility assessment mechanisms that evaluate agent interfaces against standardized protocol requirements to ensure seamless integration with existing routing infrastructure. For example, the system may transmit capability probe requests that contain sample computational tasks to verify agent processing abilities, analyze agent response formats to confirm compatibility with expected data structures and communication protocols, and execute performance benchmark tests that measure agent response times and computational throughput to establish baseline performance characteristics for routing optimization algorithms.

The autonomous routing system may implement cryptographic identity generation mechanisms that create unique blockchain-based identifiers for newly discovered agents while ensuring identity uniqueness and cryptographic verifiability across the distributed network. The identity generation process may establish secure cryptographic foundations that enable agent authentication and data attribution throughout the distributed system lifecycle. The autonomous routing system may generate a corresponding new blockchain identity for each new artificial intelligence agent through cryptographic key generation procedures that create unique public-private key pairs for each agent, derive blockchain addresses from public key data using deterministic hash functions, and establish cryptographic relationships that enable secure identity verification without centralized authentication authorities.

The blockchain identity creation process may implement elliptic curve cryptography algorithms that generate cryptographically secure key pairs with sufficient entropy to prevent collision attacks and ensure identity uniqueness across large-scale distributed deployments, apply secure hash algorithm implementations that transform public key coordinates into deterministic blockchain addresses suitable for distributed ledger storage and retrieval operations, and utilize base 58 encoding schemes that convert binary hash outputs into human-readable address formats compatible with various blockchain infrastructure implementations. For example, the system may generate 256-bit private keys using cryptographically secure random number generators that provide sufficient entropy for long-term security, derive corresponding public keys through elliptic curve point multiplication operations that establish mathematical relationships between private and public key components, and compute blockchain addresses through double SHA-256 hash operations followed by RIPEMD-160 hash functions that produce compact address representations suitable for blockchain transaction processing and identity verification procedures.

The system may implement comprehensive data storage mechanisms that maintain persistent records of agent capabilities and identity information within distributed storage infrastructure that supports efficient retrieval and update operations. The storage architecture may provide scalable data management capabilities that accommodate growing numbers of agents while maintaining query performance and data consistency across distributed system components. The autonomous routing system may store each corresponding new blockchain identity with the corresponding set of actions enabled to be performed by each new artificial intelligence agent through database operations that create indexed records linking agent identities to capability profiles, implement data replication mechanisms that maintain synchronized copies of agent information across multiple storage locations, and establish data integrity verification procedures that detect and prevent corruption of stored agent profiles through cryptographic checksums and validation algorithms.

The storage implementation may utilize distributed database technologies that partition agent data across multiple storage nodes to improve query performance and provide fault tolerance against individual storage system failures, implement indexing strategies that optimize lookup operations based on blockchain identities and capability categories to reduce query response times during routing decision processes, and apply data compression techniques that minimize storage overhead while maintaining rapid access to frequently referenced agent information. For example, the system may create database tables with primary key indexes based on blockchain addresses to enable efficient agent lookup operations, implement secondary indexes on capability categories to support filtered queries that identify agents with specific operational capacities, and utilize database clustering mechanisms that distribute storage load across multiple database servers while maintaining data consistency through distributed transaction coordination protocols.

The autonomous routing system may implement structured message generation mechanisms that encode agent discovery information into standardized communication formats suitable for distribution across the routing network infrastructure. The message generation process may create comprehensive data packages that contain all information needed by other routing systems to incorporate newly discovered agents into their routing decision processes. The autonomous routing system may generate a routing message including each corresponding new blockchain identity with the corresponding set of actions through data serialization procedures that encode agent identities and capability information into structured message formats, implement message validation mechanisms that verify data completeness and format compliance before transmission, and apply message optimization techniques that minimize transmission overhead while preserving all information needed for agent integration processes.

The routing message structure may incorporate multiple data sections that organize agent information according to standardized schemas including agent identity sections that contain blockchain addresses and cryptographic verification data, capability sections that enumerate supported actions and operational parameters using structured taxonomies, and metadata sections that provide additional context information including discovery timestamps, system version compatibility indicators, and performance baseline measurements. For example, the system may utilize protocol buffer serialization that creates compact binary message formats optimized for network transmission efficiency, implement JSON-based message encoding that provides human-readable data structures suitable for debugging and system integration testing, and apply message compression algorithms that reduce network bandwidth consumption during message distribution while maintaining data integrity and parsing compatibility across diverse routing system implementations.

The system may implement comprehensive cryptographic signing mechanisms that provide authentication and integrity protection for routing messages distributed throughout the network infrastructure. The signing process may establish cryptographic proof of message authenticity that enables receiving systems to verify the legitimacy of agent discovery information without relying on centralized trust authorities. The autonomous routing system may generate, using a private key associated with the agent routing system, a cryptographic signature for the routing message through digital signature algorithms that create tamper-evident authentication tokens, implement signature generation procedures that process message content through cryptographic hash functions to create message digests suitable for signature operations, and apply elliptic curve digital signature algorithm implementations that provide strong cryptographic security while maintaining computational efficiency suitable for real-time message processing requirements.

The signature generation process may incorporate message preprocessing steps that normalize message content to ensure consistent signature generation across different system implementations, apply cryptographic salt values that enhance signature entropy and prevent signature prediction attacks, and implement signature format standardization that ensures compatibility with various cryptographic verification libraries and blockchain infrastructure components. For example, the system may compute SHA-256 hash digests of routing message content to create fixed-length message representations suitable for signature algorithms, apply ECDSA signature generation using secp256k1 elliptic curve parameters that provide compatibility with major blockchain implementations, and encode digital signatures using distinguished encoding rules that create standardized signature formats compatible with various cryptographic verification systems and ensure consistent signature validation across different routing system implementations.

The autonomous routing system may implement comprehensive message distribution mechanisms that propagate agent discovery information to other routing systems throughout the distributed network infrastructure. The distribution process may ensure that newly discovered agent information reaches all relevant routing systems while maintaining network efficiency and preventing message flooding that could degrade system performance. The autonomous routing system may transmit, to a plurality of routing systems, a message including each corresponding new blockchain identity with the corresponding set of actions and the cryptographic signature through network communication protocols that support reliable message delivery, implement message routing algorithms that identify appropriate recipient systems based on network topology and routing policies, and apply delivery confirmation mechanisms that verify successful message reception and processing by target routing systems.

The message distribution implementation may utilize gossip protocol mechanisms that enable efficient information propagation through peer-to-peer communication patterns, implement message deduplication algorithms that prevent redundant message transmission and reduce network bandwidth consumption, and apply adaptive transmission strategies that adjust message distribution patterns based on network conditions and recipient system availability. For example, the system may establish secure communication channels with peer routing systems using transport layer security protocols that protect message content during transmission, implement exponential backoff retry mechanisms that handle temporary network failures and ensure eventual message delivery despite transient connectivity issues, and utilize message acknowledgment protocols that confirm successful message processing and enable sender systems to track information propagation status across the distributed routing network infrastructure.

Additional Implementations

The autonomous routing system may implement a digital pheromone trail system that provides a mechanism for recording and maintaining information about successful communication routes between artificial intelligence agents within the distributed computing environment. The digital pheromone system may translate biological pheromone concepts into computational frameworks that enable agents to leave persistent markers indicating successful communication pathways while maintaining temporal dynamics that allow outdated route information to naturally fade from the system. The autonomous routing system may create digital pheromone records that contain metadata about communication success rates, performance characteristics, and route quality metrics that can be accessed by other agents when making routing decisions. For example, the system may implement pheromone data structures that include route identifiers specifying source and destination agent addresses, performance metrics containing latency measurements and bandwidth utilization statistics, and quality scores derived from successful communication outcomes that enable quantitative comparison of different routing alternatives across the distributed network infrastructure.

The digital pheromone trail system may utilize blockchain technology to provide tamper-resistant storage and distributed access capabilities for pheromone records across the autonomous routing system. The blockchain implementation may ensure that pheromone information remains accessible to all participating agents while preventing unauthorized modification or deletion of historical route performance data that could compromise routing decision accuracy. The system may store pheromone records as blockchain transactions that contain structured data fields including route specifications, performance measurements, and temporal markers that enable agents to evaluate route quality based on empirical evidence rather than theoretical assessments. The blockchain storage mechanism may provide cryptographic verification capabilities that enable agents to authenticate pheromone records and verify the identity of agents that deposited specific pheromone information, preventing malicious agents from introducing false routing information that could degrade system performance or compromise communication reliability across the distributed agent network.

The pheromone deposition process may occur automatically when artificial intelligence agents successfully complete communication operations through specific routing pathways within the distributed system. The autonomous routing system may monitor communication outcomes and generate pheromone records when agents achieve successful task completion or data exchange through particular network routes, creating positive reinforcement signals that strengthen successful pathways over time. The system may calculate pheromone strength values based on multiple performance factors including communication latency, data transmission success rates, and overall task completion quality to ensure that pheromone deposits accurately reflect the actual utility of specific routing pathways. For example, the system may implement pheromone strength calculation algorithms that assign higher strength values to routes demonstrating consistently low latency and high reliability, incorporate weighted scoring mechanisms that account for different types of communication tasks and their respective performance requirements, and apply normalization procedures that ensure pheromone strength values remain within standardized ranges that enable meaningful comparison across different routing alternatives and temporal periods.

The system may implement sophisticated evaporation mechanisms that enable pheromone strength values to decrease over time according to mathematical formulas that model the temporal decay characteristics observed in biological pheromone systems. The pheromone strength may decrease over time following an exponential decay formula where the current strength equals the initial strength multiplied by the exponential function of negative lambda times elapsed time, with lambda representing the evaporation rate parameter that controls the speed of pheromone decay. The exponential decay function may ensure that older pheromone records have progressively less influence on routing decisions while maintaining sufficient persistence to capture stable routing patterns and performance trends across extended operational periods. The evaporation rate parameter may adapt based on system volatility conditions including network topology changes, agent availability fluctuations, and performance variability measurements that indicate the stability of the current operational environment, enabling the system to retain pheromone information longer during stable periods while accelerating evaporation during periods of rapid change that could make historical routing information less relevant for current decision-making processes.

The autonomous routing system may implement adaptive evaporation rate adjustment mechanisms that monitor environmental conditions and dynamically modify pheromone decay parameters to optimize routing performance under varying operational circumstances. The system may analyze network stability indicators including agent connection patterns, communication failure rates, and performance consistency metrics to determine appropriate evaporation rates that balance the preservation of valuable historical routing information against the need to adapt quickly to changing network conditions. The evaporation rate adaptation algorithms may increase decay rates during periods of high system volatility when network topology changes frequently or agent availability fluctuates significantly, ensuring that outdated routing information does not persist long enough to negatively impact routing decisions based on obsolete network conditions. Conversely, the system may decrease evaporation rates during stable operational periods when network topology remains consistent and agent performance demonstrates predictable patterns, enabling the accumulation of robust historical routing data that can inform routing decisions with greater confidence and accuracy over extended time periods.

The blockchain storage and maintenance mechanisms may implement specialized data structures and indexing systems that optimize pheromone record storage efficiency while supporting rapid retrieval operations needed for real-time routing decisions. The system may organize pheromone records within blockchain transactions using hierarchical data structures that group related routing information according to source-destination pairs, temporal ranges, and performance categories to facilitate efficient query processing and data retrieval operations. The blockchain implementation may utilize merkle tree structures that enable efficient verification of pheromone record authenticity without requiring complete blockchain data downloads, reducing network bandwidth requirements and improving query response times for agents accessing pheromone information during routing decision processes. The system may implement distributed caching mechanisms that maintain frequently accessed pheromone records in high-speed memory systems across multiple blockchain nodes, enabling rapid access to popular routing information while maintaining the distributed consensus and tamper-resistance characteristics provided by the underlying blockchain infrastructure for long-term data persistence and integrity verification.

The autonomous routing system may implement a waggle dance protocol that enables artificial intelligence agents to share successful routing discoveries with neighboring agents through structured communication mechanisms derived from honeybee colony behaviors. The waggle dance protocol may provide a distributed information sharing framework where agents that discover high-quality communication routes can broadcast route information to other agents within their local network vicinity, enabling rapid propagation of routing improvements throughout the distributed system without requiring centralized coordination or global state synchronization. The protocol may facilitate peer-to-peer knowledge transfer by encoding successful route characteristics into standardized message formats that can be efficiently transmitted and processed by receiving agents to update their local routing tables and decision-making algorithms.

The route information encoding mechanisms within the waggle dance protocol may transform complex routing data into compact message structures that minimize network bandwidth consumption while preserving the detailed performance characteristics needed for informed routing decisions. The system may encode route information including path details that specify the sequence of intermediate agents or network nodes traversed during successful communications, quality metrics that quantify performance characteristics such as latency measurements, bandwidth utilization statistics, and reliability indicators derived from successful transmission outcomes. The encoding process may incorporate confidence levels that reflect the statistical significance and reliability of the reported performance data based on factors including the number of successful communications observed, the temporal consistency of performance measurements, and the reputation score of the reporting agent within the distributed system.

The path details encoding component may utilize hierarchical data structures that represent routing pathways through sequences of agent identifiers or network addresses arranged according to the communication flow direction from source to destination agents. The system may implement path compression algorithms that reduce the storage and transmission overhead associated with multi-hop routing paths by eliminating redundant intermediate nodes, applying route summarization techniques that group similar pathway segments, and utilizing reference-based encoding schemes that replace frequently occurring path segments with compact identifier codes that can be expanded by receiving agents using shared lookup tables. The path encoding mechanisms may incorporate temporal markers that indicate when specific path segments were last verified or utilized successfully, enabling receiving agents to assess the currency and relevance of shared routing information when making their own routing decisions.

The quality metrics encoding process may aggregate multiple performance dimensions into standardized numerical representations that enable quantitative comparison of different routing alternatives across diverse operational contexts and agent configurations. The system may encode latency measurements using statistical summaries that include average response times, variance indicators that characterize performance consistency, and percentile-based metrics that describe typical and worst-case performance scenarios observed during successful communications. The bandwidth utilization encoding may capture both absolute throughput measurements and relative capacity utilization percentages that account for the varying network capabilities of different agents and communication pathways, enabling receiving agents to assess route suitability based on their specific bandwidth requirements and current network conditions.

The confidence level calculation mechanisms may evaluate the reliability and trustworthiness of shared routing information based on multiple factors that characterize the quality and completeness of the underlying performance data. The system may calculate confidence scores based on the number of successful communication instances observed through specific routes, with higher sample sizes contributing to increased confidence in reported performance characteristics. The confidence calculation algorithms may incorporate temporal factors that account for the recency of performance observations, applying higher confidence weights to recently verified routing information while reducing confidence levels for older performance data that may no longer accurately reflect current network conditions and agent capabilities.

The message broadcasting mechanisms may utilize gossip protocols that enable efficient distribution of waggle dance messages throughout local agent neighborhoods without requiring complete network topology knowledge or centralized message routing infrastructure. The system may implement probabilistic message forwarding algorithms where agents receiving waggle dance messages may retransmit the information to a subset of their neighboring agents based on calculated forwarding probabilities that balance information propagation coverage against network communication overhead. The gossip protocol implementation may incorporate message deduplication mechanisms that prevent redundant transmission of identical routing information, utilize time-to-live counters that limit the propagation distance of waggle dance messages to prevent network flooding, and apply message priority schemes that prioritize the transmission of high-quality routing discoveries over less significant performance improvements.

The message verification and authentication mechanisms within the waggle dance protocol may ensure that shared routing information originates from legitimate agents and has not been corrupted or maliciously modified during transmission through the distributed network. The system may implement cryptographic signature schemes where agents digitally sign their waggle dance messages using private keys associated with their blockchain identities, enabling receiving agents to verify message authenticity through public key cryptography operations that confirm the identity of the message originator. The verification process may include integrity checks that detect message corruption or tampering through cryptographic hash comparisons, reputation-based filtering that weights routing information based on the historical accuracy and trustworthiness of reporting agents, and anomaly detection algorithms that identify potentially malicious or erroneous routing information based on statistical analysis of reported performance characteristics compared to known network conditions.

The local routing table update mechanisms may process received waggle dance messages to incorporate new routing information into agent-specific decision-making frameworks while maintaining consistency with existing routing knowledge and performance expectations. The system may implement selective update algorithms that evaluate whether newly received routing information represents genuine improvements over currently known routes, considering factors such as performance metric comparisons, confidence level assessments, and compatibility with local agent capabilities and requirements. The update process may utilize weighted averaging techniques that combine new routing information with existing knowledge to produce refined performance estimates that account for multiple information sources, apply temporal decay functions that gradually reduce the influence of older routing information as newer data becomes available, and implement conflict resolution mechanisms that handle contradictory routing information received from different agents through statistical analysis and reputation-weighted decision algorithms.

Computing Environment

Figure 5:
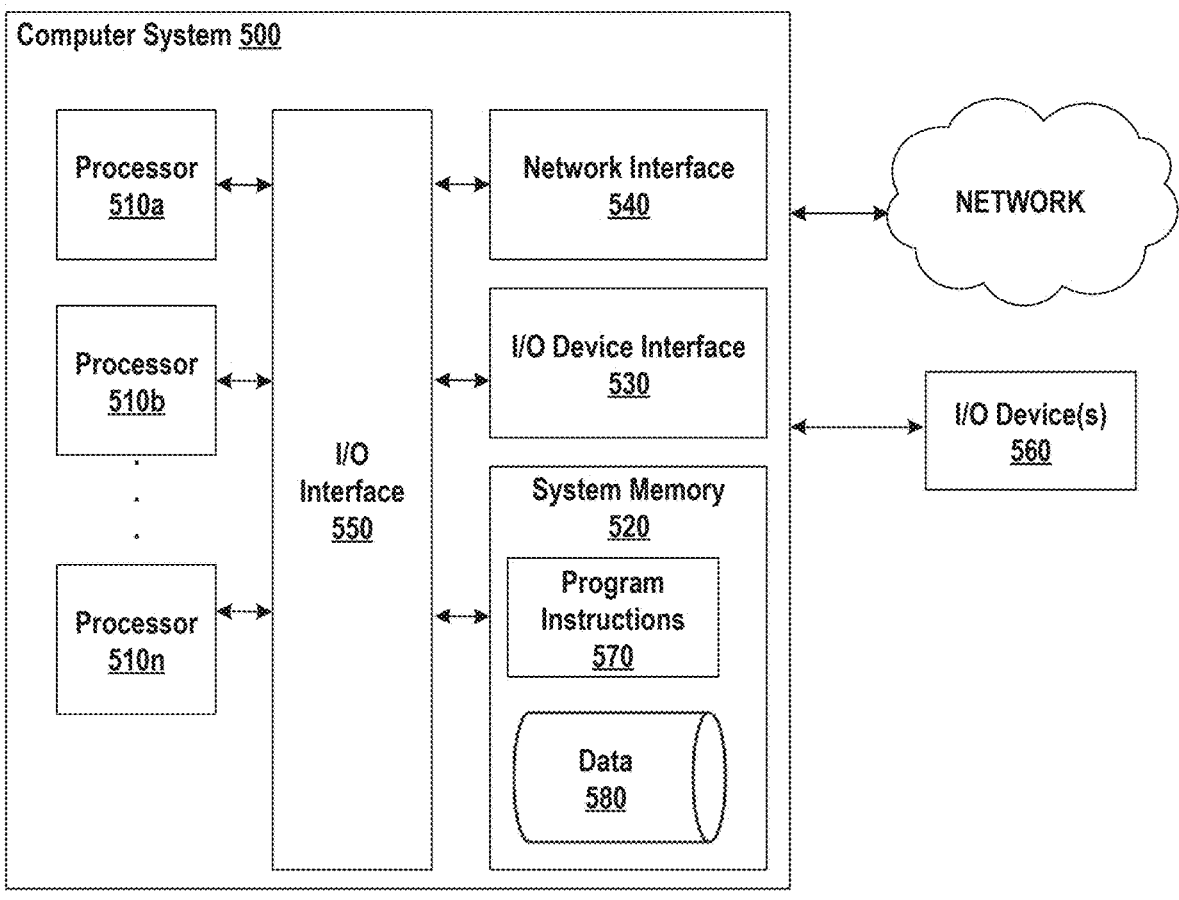
FIG. 5 illustrates an exemplary computing system, in accordance with one or more embodiments of this disclosure.

FIG. 5 shows an example computing system that may be used in accordance with some embodiments of this disclosure. In some instances, computing system 500 is referred to as a computer system 500. A person skilled in the art would understand that those terms may be used interchangeably.

The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510a), or a multi-processor system including any number of suitable processors (e.g., 510a, 510b-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 520 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 520 may include a non-transitory computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500, or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Blockchain Environment

Figure 6:
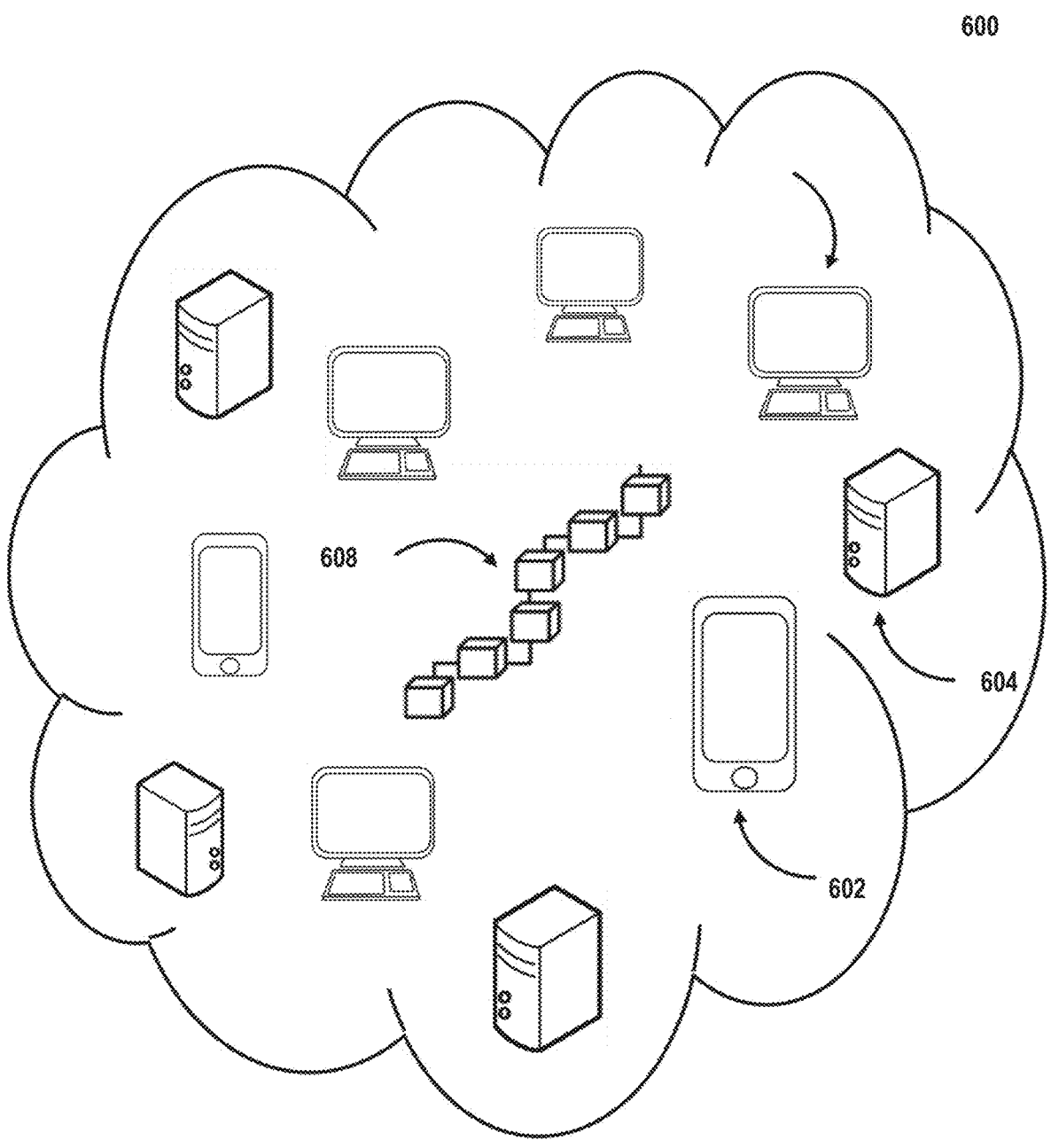
FIG. 6 illustrates an exemplary blockchain environment, in accordance with one or more embodiments of this disclosure.

FIG. 6 shows an illustrative diagram for a decentralized environment for performing blockchain functions or operations, in accordance with one or more embodiments. For example, the diagram presents various components that may be used to allocate and distribute cryptographic resources in response to an off-chain trigger or event upon request, in some embodiments.

As shown in FIG. 6, environment 600 may include multiple user devices (e.g., user device 602 and/or user device 604). For example, environment 600 may include a distributed state machine, in which each of the components in FIG. 6 acts as a client. For example, environment 600 (as well as other systems described herein) may comprise a large data structure that holds not only all accounts and balances but also a state machine which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, devices within environment 600 may interact with, and facilitate the function of, blockchain 608.

It should be noted that, while shown as a smartphone, a personal computer, and a server in FIG. 6, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing performing a blockchain function may equally be applied to, and correspond to, an individual user device (e.g., user device 602 and/or user device 604) performing the blockchain function.

Each of the user devices may be used by the system to conduct blockchain functions or operations and/or contribute to allocating and distributing cryptographic resources in response to an off-chain trigger or event upon request. As referred to herein, "blockchain functions" or "blockchain operations" may comprise any operations including and/or related to blockchains and blockchain technology. For example, blockchain functions or operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain function or operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain functions or operations may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for enabling Turing-complete computation while limiting the resources that any smart contract and/or blockchain function may consume.

In some embodiments, gas may be obtained as part of a blockchain function or operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 6, one or more user devices may include a digital wallet (e.g., cryptography-based storage application described above) used to perform blockchain functions or operations. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the Internet while cold wallets are not. Most digital wallet holders hold both a hot wallet (e.g., residing on a computing device) and a cold wallet (residing on a device that is generally disconnected from a computing device and is not accessible until connected). Hot wallets are most often used to perform blockchain functions, while a cold wallet is generally used for managing a user account and may have no connection to the Internet.

One or more user devices may include a private key and a public key. In such cases, each pair comprises a public key (e.g., which may be public) and a private key (e.g., which may be kept private). Key pairs may be generated using cryptographic algorithms (e.g., featuring one-way functions). Computing devices may then encrypt a message using an intended receiver's public key such that the encrypted message may be decrypted only with the receiver's corresponding private key. In some embodiments, a message may be used in combination with a private key to create a digital signature on the message. For example, the digital signature may be used to verify the authenticity of blockchain functions or operations. As an illustration, when conducting blockchain functions, the digital signature may be used to prove to every node in the system that it is authorized to conduct the blockchain functions.

For example, environment 600 may include a plurality of nodes for the blockchain network. A node for a blockchain network may comprise an application or other software that records and/or monitors peer connections to other nodes and/or miners for the blockchain network. For example, a miner comprises a node in a blockchain network that facilitates blockchain functions by verifying blockchain functions or operations on the blockchain, adding new blocks to the existing chain, and/or ensuring that these additions are accurate. The nodes may continually record the state of the blockchain and respond to remote procedure requests for information about the blockchain.

Following an authentication of the blockchain function, the blockchain function may be authorized. For example, after the blockchain function is authenticated between the users, environment 600 may authorize the blockchain function prior to adding it to the blockchain. Blockchain function or operations may be added to blockchain 608 via blockchain nodes. The blockchain may perform this (via blockchain nodes) based on a consensus within the blockchain network. For example, environment 600 may rely on a majority (or other metric) of the nodes in the community network to determine that the blockchain function or operation is valid. In response to validation of the block, a blockchain node in the community network (e.g., a miner) may receive a reward (e.g., in a given cryptocurrency) as an incentive for validating the block.

To validate the blockchain function, a blockchain node may use one or more validation protocols and/or validation (or consensus) mechanisms. For example, a blockchain node may use a Proof of Work (POW) mechanism in which a user device must provide evidence that it performed computational work to validate a blockchain function, and thus this mechanism provides for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, a blockchain node may use a Proof of Stake (POS) mechanism in which a user account (e.g., corresponding to a node on the blockchain network) is required to have, or "stake," a predetermined amount of tokens in order to be recognized as a validator in the blockchain network. In response to validation of the block, the block is added to blockchain 608, and the blockchain function is completed. For example, to add the blockchain function to blockchain 608, the successful node (e.g., the successful miner) encapsulates the blockchain function in a new block before committing it to the blockchain.

Machine Learning

Figure 7:
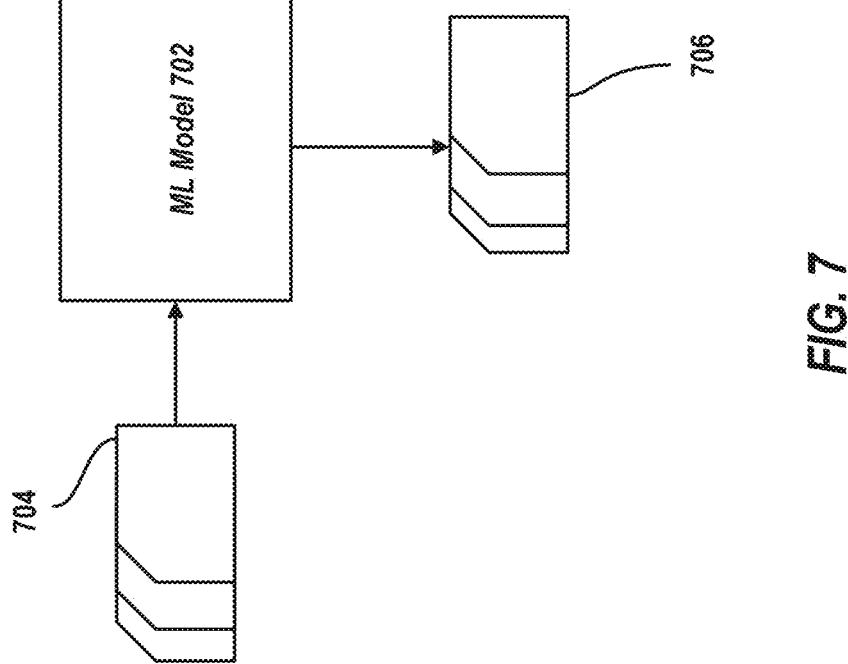
FIG. 7 illustrates exemplary machine learning models, in accordance with one or more embodiments of this disclosure.

FIG. 7 illustrates an exemplary machine learning model 702. According to some examples, the machine learning model may be any model, such as a model for data imputation. For example, the machine learning model may be trained to intake input 704. As a result of inputting the input 704 into the machine learning model, the model may then output an output 706, which may include, for example, an imputed value. Furthermore, as described, the machine learning model may be configured to output a confidence interval or other metric for certainty regarding the outputs. Output 706 may include output parameters.

The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction and reference feedback information (e.g., user indication of accuracy, reference labels, or other information). Connection weights may be adjusted, for example, if the machine learning model is a neural network, to reconcile differences between the neural network's prediction and the reference feedback.

One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model may be self-learning and/or trained rather than explicitly programmed and may perform significantly better in certain areas of problem-solving as compared to computer programs that do not use machine learning. During training, an output layer of the machine learning model may correspond to a classification or imputation of the machine learning model, and an input known to correspond to that classification or imputation value may be input into an input layer of the machine learning model during training. During testing, an input without a known classification or known imputation value may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector. The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from publicly available sources. Such a technique may be used to identify values and generate a corpus that can be accessed to impute values. For example, in some embodiments, if a value is missing, the model may access the corpus to identify relevant information for the missing value. For example, the values can be used to calculate the missing value. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. The specific training samples may be used to generate language in a certain style or in a certain format.

Some concepts in ML-based language models will now be discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or, in the case of an LLM, may contain millions or billions of learned parameters or more. As non-limiting examples, a language model may generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models may also be used for chatbots (e.g., virtual assistance).

A type of neural network architecture, referred to as a "transformer," may be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 8:
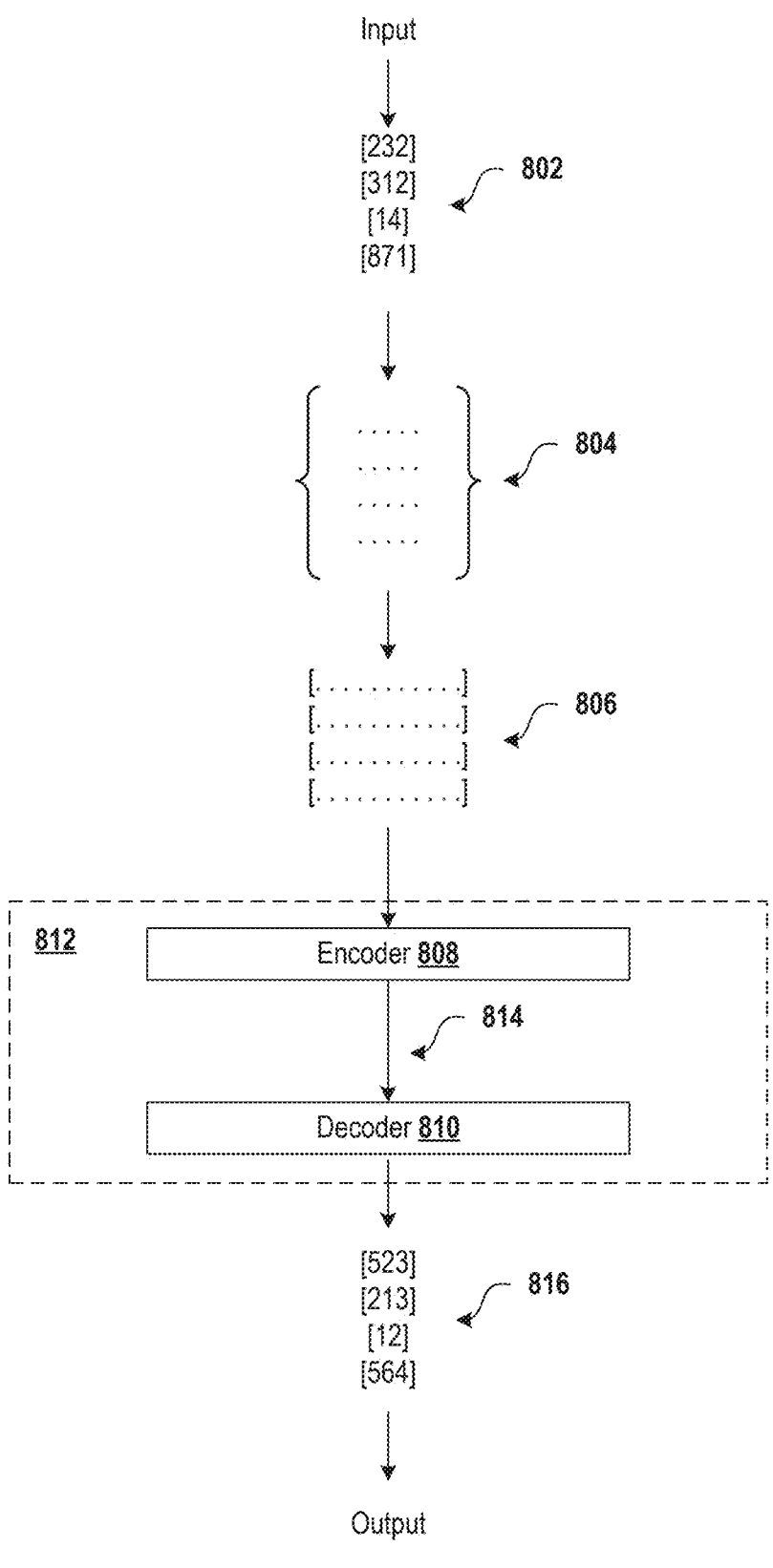
FIG. 8 is a block diagram of an example transformer that may be used for efficiently routing action requests submitted to a generative learning model, in accordance with one or more embodiments of this disclosure.

FIG. 8 is a block diagram of an example transformer 812. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

Transformer 812 may include an encoder 808 (which may include one or more encoder layers/blocks connected in series) and a decoder 810 (which may include one or more decoder layers/blocks connected in series). Generally, encoder 808 and decoder 810 may each include multiple neural network layers, at least one of which may be a self-attention layer. The parameters of the neural network layers may be referred to as the parameters of the language model.

Transformer 812 may be trained to perform certain functions on a natural language input. Examples of the functions include summarizing existing content, brainstorming ideas, writing a rough draft, fixing spelling and grammar, and translating content. Summarizing may include extracting key points or themes from an existing content in a high-level summary. As described herein, it may take existing content from publicly available sources (e.g., text, images, etc.) to help in imputing missing values. Brainstorming ideas may include generating a list of ideas based on provided input. For example, the ML model may generate a list of names for a startup or costumes for an upcoming party. Writing a rough draft may include generating writing in a particular style that may be useful as a starting point for the user's writing. The style may be identified as, e.g., an email, a blog post, a social media post, or a poem. Fixing spelling and grammar may include correcting errors in an existing input text. Translating may include converting an existing input text into a variety of different languages. In some implementations, transformer 812 is trained to perform certain functions on other input formats than natural language input. For example, the input may include objects, images, audio content, or video content, or a combination thereof. In some examples, this may be used to generate commands for authorizing and completing the transaction, for example.

Transformer 812 may be trained on a text corpus that is labeled (e.g., annotated to indicate verbs, nouns) or unlabeled. LLMs may be trained on a large unlabeled corpus. The term "language model," as used herein, may include an ML-based language model (e.g., a language model that is implemented using a neural network or other ML architecture), unless stated otherwise. Some LLMs may be trained on a large multi-language, multi-domain corpus to enable the model to be versatile at a variety of language-based tasks such as generative tasks (e.g., generating human-like natural language responses to natural language input).

FIG. 8 illustrates an example of how transformer 812 may process textual input data. Input to a language model (whether transformer-based or otherwise) typically is in the form of natural language that may be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without white space appended. In some implementations, a token may correspond to a portion of a word.

For example, the word "greater" may be represented by a token for [great] and a second token for [er]. In another example, the text sequence "write a summary" may be parsed into the segments [write], [a], and [summary], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a list, a paragraph), an [EOT] token may be another special token that indicates the end of the textual sequence, other tokens can provide formatting information, etc.

In FIG. 8, a short sequence of tokens 802 corresponding to the input text is illustrated as input to transformer 812. Tokenization of the text sequence into tokens 802 may be performed by some pre-processing tokenization module such as, for example, a byte-pair encoding tokenizer (the "pre" referring to the tokenization occurring prior to the processing of the tokenized input by the LLM), which is not shown in FIG. 8 for brevity. In general, the token sequence that is inputted into transformer 812 may be of any length up to a maximum length defined based on the dimensions of transformer 812. Each token 802 in the token sequence is converted into an embedding 806 (also referred to as "embedding vector").

Embedding 806 is a learned numerical representation (such as, for example, a vector) of a token that captures some semantic meaning of the text segment represented by the token 802. Embedding 806 represents the text segment corresponding to token 802 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, embedding 806 corresponding to the "write" token will be closer to another embedding corresponding to the "jot down" token in the vector space as compared to the distance between the embedding 806 corresponding to the "write" token and another embedding corresponding to the "summary" token.

The vector space may be defined by the dimensions and values of the embedding vectors. Various techniques may be used to convert token 802 into embedding 806. For example, another trained ML model may be used to convert token 802 into embedding 806. In particular, another trained ML model may be used to convert token 802 into embedding 806 in a way that encodes additional information into embedding 806 (e.g., a trained ML model may encode positional information about the position of token 802 in the text sequence into the embedding 806). In some implementations, the numerical value of token 802 may be used to look up the corresponding embedding in an embedding matrix 804, which may be learned during training of transformer 812.

The generated embeddings, e.g., such as embedding 806, are input into the encoder 808. Encoder 808 serves to encode embedding 806 into feature vectors 814 that represent the latent features of embedding 806. Encoder 808 can encode positional information (i.e., information about the sequence of the input) in feature vectors 814. Feature vectors 814 may have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as feature vectors 814 that may be generated by encoder 808 may be referred to as a latent space or feature space.

Conceptually, decoder 810 is designed to map the features represented by feature vectors 814 into meaningful output, which may depend on the task that was assigned to transformer 812. For example, if transformer 812 is used for a translation task, decoder 810 may map feature vectors 814 into text output in a target language different from the language of the original tokens 802. Generally, in a generative language model, decoder 810 serves to decode feature vectors 814 into a sequence of tokens. Decoder 810 may generate output tokens 816 one by one. Each output token 816 may be fed back as input to decoder 810 in order to generate the next output token 816. By feeding back the generated output and applying self-attention, decoder 810 may generate a sequence of output tokens 816 that has sequential meaning (e.g., the resulting output text sequence is understandable as a sentence and obeys grammatical rules). Decoder 810 may generate output tokens 816 until a special [EOT] token (indicating the end of the text) is generated. The resulting sequence of output tokens 816 can then be converted to a text sequence in post-processing. For example, each output token 816 may be an integer number that corresponds to a vocabulary index. By looking up the text segment using the vocabulary index, the text segment corresponding to each output token 816 may be retrieved, the text segments may be concatenated together, and the final output text sequence can be obtained.

In some implementations, the input provided to transformer 812 includes instructions to perform a function on an existing text. The output may include, for example, a modified version of the input text and instructions to modify the text. The modification may include summarizing, translating, correcting grammar or spelling, changing the style of the input text, lengthening or shortening the text, or changing the format of the text (e.g., adding bullet points or checkboxes).

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that may then be further processed by a task-specific layer (e.g., a classification layer). BERT is an example of a language model that may be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models may be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system may access a remote language model (e.g., a cloud-based language model), such as ChatGPT or GPT-3, via a software interface (e.g., an API). Additionally or alternatively, such a remote language model may be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt may optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Figure 9:
FIG. 9 is a flowchart of operations or efficiently routing action requests submitted to a generative learning model, in accordance with one or more embodiments of this disclosure.
Figure 9:
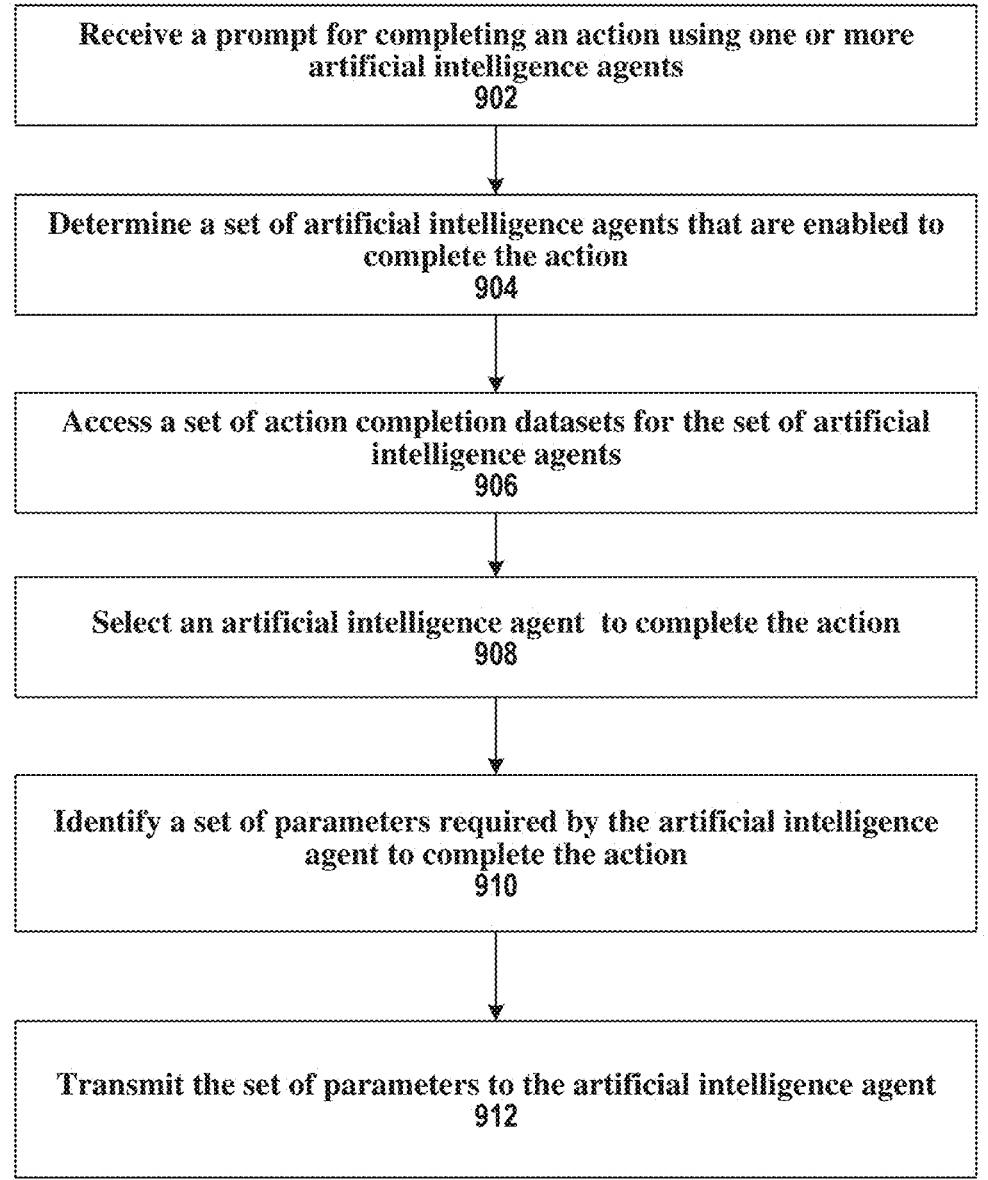

Process 900 illustrated in FIG. 9 begins a 902, which involves receiving a prompt for completing an action using one or more artificial intelligence agents. This initial step may be performed by the computer system 500 shown in FIG. 5, where the prompt may be received through the network interface 540 from external systems or users. The prompt processing may utilize the program instructions 570 stored in system memory 520, which may include natural language processing capabilities similar to those described for transformer 812 in FIG. 8. The received prompt may be tokenized and converted into embeddings using techniques similar to those employed by the embedding matrix 804 and encoder 808 components of transformer 812, enabling the system to understand and parse the action requirements contained within the natural language prompt.

Process 900 then proceeds to 904, where a set of artificial intelligence agents that are enabled to complete the action is determined. This determination may be executed by the processors 510a through 510n of computer system 500, which may access agent capability databases through memory 520. The capability assessment algorithms may operate similarly to the feature vector processing performed by encoder 808 in transformer 812, where agent specifications and operational parameters are encoded into high-dimensional feature representations that enable efficient comparison and filtering operations. The environment 600 illustrated in FIG. 6 may provide the distributed infrastructure for maintaining agent registry information, with mobile device 602 and user device 604 representing different types of agents that may be evaluated for task compatibility.

Following the determination, process 900 moves to 906, where a set of action completion datasets for the set of artificial intelligence agents is accessed. This data access operation may be facilitated by the network interface 540 of computer system 500, which may communicate with distributed storage systems similar to the blockchain 608 structure shown in FIG. 6. The data retrieval process may utilize the input output interface 550 to coordinate between multiple storage locations, while the system memory 520 may cache frequently accessed performance records to optimize query response times. The blockchain infrastructure depicted in FIG. 6 may provide the tamper-resistant storage mechanism for maintaining historical performance data, with the distributed nature of the blockchain 608 ensuring data availability across multiple network nodes.

Process 900 then advances to 908, where an artificial intelligence agent is selected to complete the action. This selection process may be performed by the processors 510a through 510n executing sophisticated decision algorithms stored as program instructions 570 in system memory 520. The selection logic may employ machine learning techniques similar to those used in transformer 812, where the decoder 810 component's decision-making capabilities may be adapted for agent evaluation rather than text generation. The frequency composite parameter and time composite parameter calculations may be processed using the computational resources of computer system 500, with the multiple processors enabling parallel evaluation of candidate agents to optimize selection speed and accuracy.

Process 900 continues to 910, where a set of parameters required by the artificial intelligence agent to complete the action is identified. This parameter identification may utilize the natural language processing capabilities similar to those employed by transformer 812, where the encoder 808 and decoder 810 components may be adapted to analyze task requirements and extract relevant parameter specifications. Computer system 500 may use its data storage to maintain parameter template libraries and dependency mapping information, while the processors 510a through 510n execute parameter resolution algorithms that ensure all necessary inputs are identified for successful task execution.

Finally, at 912, process 900 concludes with transmitting the set of parameters to the artificial intelligence agent. This transmission may be accomplished through the network interface 540 of computer system 500, which may establish secure communication channels with the selected agent. The environment 600 may provide the cryptographic infrastructure for secure parameter delivery, with the distributed nature of blockchain 608 ensuring reliable message delivery even in the presence of network failures. The input output devices 560 may provide monitoring and logging capabilities that track parameter transmission status, while the system memory 520 may maintain delivery confirmation records to ensure successful task initiation and enable performance tracking for future routing decisions.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

A number of implementations have been described. Nevertheless, it will be understood that various modifications may be made without departing from the spirit and scope of the disclosure. Accordingly, other implementations are within the scope of the following claims.

1. A method comprising: receiving, at an agent routing system, a prompt for completing an action using one or more artificial intelligence agents of a plurality of artificial intelligence agents, wherein each artificial intelligence agent of the plurality of artificial intelligence agents is associated with a corresponding computer-executable operation set configured to be autonomously executed by a corresponding artificial intelligence agent on a software application set; determining a set of artificial intelligence agents from the plurality of artificial intelligence agents that are enabled to complete the action; accessing a set of action completion datasets for the set of artificial intelligence agents, wherein each action completion dataset comprises a corresponding plurality of action parameters for a plurality of actions completed by each artificial intelligence agent, and wherein each plurality of parameters comprises (1) a corresponding status parameter indicating whether a corresponding action was completed successfully and (2) a corresponding timestamp of when the corresponding action was completed; selecting, based on a corresponding frequency composite parameter generated based on each status parameter indicating successfully completing the corresponding action and a time composite parameter indicating a time of successfully completing the corresponding action, an artificial intelligence agent of the set of artificial intelligence agents to complete the action; identifying a set of parameters required by the artificial intelligence agent to complete the action; and transmitting the set of parameters to the artificial intelligence agent.

2. The method of any preceding embodiments, further comprising: receiving a message from the artificial intelligence agent comprising a completion status associated with the action, wherein the message comprises one or more status parameters associated with the completion status; generating a blockchain operation comprising the one or more status parameters received from the artificial intelligence agent, wherein the blockchain operation is cryptographically signed by a private key associated with the agent routing system; and transmitting the blockchain operation to a blockchain node, wherein the blockchain node commits the blockchain operation to a blockchain.

3. The method of any preceding embodiments, wherein accessing the set of action completion datasets for the set of artificial intelligence agents further comprises: determining for each artificial intelligence agent, based on a corresponding public key associated with each artificial intelligence agent, a corresponding blockchain identifier that identifies each artificial intelligence agent on a blockchain; and transmitting a search operation to a blockchain node, wherein the search operation comprises each corresponding blockchain identifier for each artificial intelligence agent.

4. The method of any preceding embodiments, wherein selecting, based on the corresponding frequency composite parameter and the time composite parameter, the artificial intelligence agent, further comprises: retrieving a plurality of status parameters for each artificial intelligence agent and corresponding timestamps; aggregating, for each artificial intelligence agent in the set of artificial intelligence agents, a corresponding plurality of status parameter indicating successfully completing the corresponding action into the corresponding frequency composite parameter, and a corresponding plurality of timestamps into the time composite parameter; and selecting the artificial intelligence agent based on a combination of a highest frequency composite parameter and a shortest time composite parameter.

5. The method of any preceding embodiments, further comprising: detecting availability of a new plurality of artificial intelligence agents; determining, for each new artificial intelligence agent of the new plurality of artificial intelligence agents, a corresponding set of actions enabled to be performed by each new artificial intelligence agent; generating a corresponding new blockchain identity for each new artificial intelligence agent; and storing each corresponding new blockchain identity with the corresponding set of actions enabled to be performed by each new artificial intelligence agent.

6. The method of any preceding embodiments, further comprising: generating a routing message comprising each corresponding new blockchain identity with the corresponding set of actions; generating, using a private key associated with the agent routing system a cryptographic signature for the routing message; and transmitting, to a plurality of routing systems, a message comprising each corresponding new blockchain identity with the corresponding set of actions and the cryptographic signature.

7. The method of any preceding embodiments, further comprising: receiving a message from the artificial intelligence agent comprising a completion status associated with the action, wherein the message comprises one or more status parameters associated with the completion status and a cryptographic signature associated with the artificial intelligence agent, and wherein the cryptographic signature is generated using a private key associated with the artificial intelligence agent, the private key being associated with a public key derivable from a blockchain identifier associated with the artificial intelligence agent; retrieving, using a blockchain node from a blockchain, the public key associated with the artificial intelligence agent; and verifying the message using the private key and the cryptographic signature.

8. One or more tangible, non-transitory, computer-readable media storing instructions that, when executed by a data processing apparatus, cause the data processing apparatus to perform operations comprising those of any of embodiments 1-7.

9. A system comprising: one or more processors; and memory storing instructions that, when executed by the one or more processors, cause the processors to effectuate operations comprising those of any of embodiments 1-7.

10. A system comprising means for performing any of embodiments 1-7.

11. A system comprising cloud-based circuitry for performing any of embodiments 1-7.

The invention claimed is:

1. A system comprising:
at least one hardware processor; and
at least one non-transitory memory storing instructions, which, when executed by the at least one hardware processor, cause the system to:
obtain an instruction to complete an action using one or more artificial intelligence agents of a plurality of artificial intelligence agents;
access a set of action completion datasets for the one or more artificial intelligence agents,
wherein each action completion dataset comprises a corresponding plurality of action parameters for a plurality of actions completed by each of the one or more artificial intelligence agents;
select, based on the corresponding plurality of action parameters, a particular artificial intelligence agent of the one or more artificial intelligence agents to complete the action;
cause execution of the action by transmitting a corresponding set of execution parameters associated with the action to the particular artificial intelligence agent;
receive a message from the particular artificial intelligence agent from the plurality of artificial intelligence agents comprising a completion status and a cryptographic signature;
verify the message using a public key associated with the particular artificial intelligence agent; and
cause transmission of an operation that indicates the completion status associated with the action to a node, wherein the node is configured to commit the operation to a distributed database.

2. The system of claim 1, wherein the instructions further cause the system to:
update at least one action completion dataset based on the completion status associated with the action.

3. The system of claim 1, wherein the instructions further cause the system to:
compare the corresponding plurality of action parameters of the one or more artificial intelligence agents to one or more criterion associated with the action.

4. The system of claim 1, wherein the distributed database comprises a blockchain.

5. A non-transitory computer-readable storage medium comprising instructions stored thereon, wherein the instructions when executed by at least one data processor of a system, cause the system to:
access an instruction to complete an action using at least one artificial intelligence agent;
identify an artificial intelligence agent set configured to complete the action;
determine, based on a corresponding action parameter set for a corresponding action set completed by each of the artificial intelligence agent set, a subset of the artificial intelligence agent set to complete the action;
cause transmission of a corresponding set of execution parameters associated with the action to the subset of the artificial intelligence agent set;
obtaining a message from a particular artificial intelligence agent from the subset of the artificial intelligence agent set comprising a completion status and a cryptographic signature;
verify the message using a public key associated with the particular artificial intelligence agent; and
cause transmission of an operation that indicates the completion status associated with the action to a distributed database.

6. The non-transitory computer-readable storage medium of claim 5, wherein the completion status comprises one or more of:
an indication of whether the action was completed according to one or more criterion; or
a timestamp that indicates when the action was completed.

7. The non-transitory computer-readable storage medium of claim 5, wherein the completion status comprises one or more of:
generate a cryptographically signed record indicating the completion status; and
cause transmission of the cryptographically signed record to a node of the distributed database.

8. The non-transitory computer-readable storage medium of claim 5, wherein the instructions further cause the system to:
determine a performance score for each artificial intelligence agent in the artificial intelligence agent set; and
determine the subset of the artificial intelligence agent set based on a corresponding performance score.

9. The non-transitory computer-readable storage medium of claim 5, wherein the instructions further cause the system to:
detect an availability of a new artificial intelligence agent different from the artificial intelligence set; and
store, in the distributed database, an identifier associated with the new artificial intelligence agent.

10. The non-transitory computer-readable storage medium of claim 5, wherein the instructions further cause the system to:
compare the corresponding action parameter set of the artificial intelligence agent set to one or more criterion associated with the action.

11. The non-transitory computer-readable storage medium of claim 5, wherein the distributed database comprises a distributed ledger.

12. A computer-implemented method comprising:
storing, in a distributed database, historical action completion data associated with a plurality of artificial intelligence agents;
receiving a request to perform an action;

generating a selection of a selected artificial intelligence agent capable of performing the action based on the historical action completion data;

causing transmission of, in response to the selection, execution data associated with the action to the selected artificial intelligence agent;

obtaining a transmittal from the selected artificial intelligence agent indicating a status associated with the performed action;

verifying the transmittal using a key associated with the selected artificial intelligence agent; and causing transmission of the status associated with the performed action to the distributed database.

13. The computer-implemented method of claim 12, wherein the historical action completion data comprises a plurality of records, each record corresponding to a previously completed action.

14. The computer-implemented method of claim 12, further comprising:

detecting an availability of a new artificial intelligence agent; and storing an identifier associated with the new artificial intelligence agent in the distributed database.

15. The computer-implemented method of claim 12, further comprising:

generating a cryptographic signature for the status associated with the performed action prior to causing transmission to the distributed database.

16. The computer-implemented method of claim 12, further comprising:

comparing the historical action completion data of the plurality of artificial intelligence agents to one or more criterion associated with the action.

17. The computer-implemented method of claim 13, further comprising:

updating the historical action completion data based on the status associated with the performed action.

18. The computer-implemented method of claim 12, wherein the distributed database comprises a distributed ledger.

19. The computer-implemented method of claim 12, further comprising:

determining a score for each artificial intelligence agent in the plurality of artificial intelligence agents; and determining the selected artificial intelligence agent based on a corresponding score.

20. The computer-implemented method of claim 12, wherein the selection of a selected artificial intelligence agent is generated based on a corresponding action parameter set for a corresponding action set completed by each of the plurality of artificial intelligence agents.

21. The computer-implemented method of claim 20, further comprising: comparing the corresponding action parameter set of the artificial intelligence agent set to one or more criterion associated with the action.

\* \* \* \* \*